United States Patent
Dai et al.

(10) Patent No.: US 9,730,222 B2
(45) Date of Patent: Aug. 8, 2017

(54) METHOD AND APPARATUS FOR DATA TRANSMISSION

(75) Inventors: Bo Dai, Shenzhen (CN); Shuqiang Xia, Shenzhen (CN); Peng Hao, Shenzhen (CN); Yada Huang, Shenzhen (CN); Jianxun Ai, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 877 days.

(21) Appl. No.: 14/388,332

(22) PCT Filed: Dec. 23, 2011

(86) PCT No.: PCT/CN2011/084572
§ 371 (c)(1),
(2), (4) Date: Sep. 26, 2014

(87) PCT Pub. No.: WO2012/129946
PCT Pub. Date: Oct. 4, 2012

(65) Prior Publication Data
US 2015/0043395 A1    Feb. 12, 2015

(30) Foreign Application Priority Data
Mar. 29, 2011    (CN) .......................... 2011 1 0077337

(51) Int. Cl.
*H04W 72/04*    (2009.01)
*H04L 5/00*    (2006.01)
*H04L 5/14*    (2006.01)

(52) U.S. Cl.
CPC ....... *H04W 72/0453* (2013.01); *H04L 5/0037* (2013.01); *H04L 5/0055* (2013.01); *H04L 5/14* (2013.01)

(58) Field of Classification Search
CPC ............ H04W 72/0453; H04L 5/0037; H04L 5/0055; H04L 5/14
See application file for complete search history.

(56) References Cited

U.S. PATENT DOCUMENTS

2010/0238880 A1* 9/2010 Wu ..................... H04W 76/048
370/329
2010/0272091 A1    10/2010 Fabien
(Continued)

FOREIGN PATENT DOCUMENTS

| CN | 101442818 A | 5/2009 |
|----|-------------|--------|
| CN | 101646234 A | 2/2010 |

OTHER PUBLICATIONS

Nokia Siemens Networks et al., Aggregating HSDPA and LTE carriers, 3GPP TSG-RAN WG1 Meeting #64, R1-111060, Feb. 21-25, 2011, p. 2 section 1, 2.1, figures 1-2.

(Continued)

*Primary Examiner* — Curtis A Alia
(74) *Attorney, Agent, or Firm* — Cantor Colburn LLP

(57) ABSTRACT

Provided are a method and apparatus for data transmission. In the method, frequency spectrum aggregation is performed on multiple first frequency spectrums corresponding to multiple systems; and data are transmitted on a second frequency spectrum formed through the frequency spectrum aggregation performed on the multiple first frequency spectrums. Through the technical solution provided, the frequency spectrum aggregation of multiple systems is implemented, and the frequency spectrum utilization of a communication system is improved.

12 Claims, 6 Drawing Sheets

(56) References Cited

U.S. PATENT DOCUMENTS

| 2010/0323744 | A1* | 12/2010 | Kim | H04W 52/06 |
| | | | | 455/522 |
| 2011/0243102 | A1* | 10/2011 | Sebire | H04W 56/0045 |
| | | | | 370/336 |
| 2012/0122448 | A1* | 5/2012 | Mueck | H04W 28/24 |
| | | | | 455/424 |

OTHER PUBLICATIONS

Research in Motion, UK Limited, Support of Carrier Aggregation with Heterogeneous Deployment of Component Carriers, 3GPP TSG RAN WG1 Meeting #58, R1-093289, Aug. 24-28, 2009, pp. 1-3.

ZTE, Uplink Control Channel Design for LTE-Advanced, 3GPP TSG-RAN WGI #57bis, RI-092464, Jun. 29, 2009-Jul. 3, 2009, pp. 1-5.

International Search Report for corresponding application PCT/CN2011/084572 filed Dec. 23, 2011; Mail date Apr. 5, 2012.

* cited by examiner

METHOD AND APPARATUS FOR DATA TRANSMISSION

TECHNICAL FIELD

The disclosure relates to the field of communications, in particular to a method and apparatus for data transmission.

BACKGROUND

There are two types of frame structures in a long-term evolution (LTE) system. Frame structure type 1 is applicable to frequency division duplex (FDD) and frequency division half-duplex. Each radio frame has a length of 10 ms, and is composed of 20 time slots, wherein each time slot is 0.5 ms, and these time slots are numbered from 0 to 19. FIG. 1 is a schematic diagram showing the frame structure of an FDD mode according to the relevant technology. As shown in FIG. 1, one subframe is composed of two continuous time slots, e.g. subframe i is composed of two continuous time slots 2i and 2i+1. No matter half-duplex FDD or full-duplex TDD, uplink and downlink transmission are implemented at different frequencies. However, as regards half-duplex FDD, a UE cannot transmit and receive data simultaneously, while such limit does not exist in full-duplex FDD, i.e. 10 downlink and 10 uplink subframes may exist at every interval of 10 ms.

Frame structure type 2 is applicable to time division duplex (TDD). FIG. 2 is a schematic diagram showing the frame structure of a TDD mode according to the relevant technology. As shown in FIG. 2, a radio frame has a length of 10 ms, and is composed of two half-frames with the length being 5 ms. One half-frame is composed of 5 subframes with the length being 1 ms. The supported uplink and downlink configurations are as shown in Table 1. In the table, "D" represents that the subframe is a downlink subframe; "U" represents that the subframe is an uplink subframe; and "S" represents that the subframe is a special subframe. The special subframe is composed of a DwPTS, a guard period (GP) and an UpPTS, and the total length is 1 ms. Each subframe i is composed of two times slots 2i and 2i+1 with the length being 0.5 ms (15360×Ts).

Frame structure type 2 supports two downlink-uplink conversion periods of 5 ms and 10 ms. In the uplink and downlink conversion period of 5 ms, both of the two half-frames have the special subframe. In the uplink and downlink conversion period of 10 ms, only the first half-frame has a special subframe. Subframes 0 and 5 and the DwPTS are always reserved for downlink transmission. The UpPTS and the subsequent subframe closely next to the special subframe are always reserved for uplink transmission. Therefore, as regards the uplink and downlink conversion period of 5 ms, the UpPTS, subframe 2 and subframe 7 are reserved for uplink transmission; and as regards the uplink and downlink conversion period of 10 ms, the UpPTS and subframe 2 are reserved for uplink transmission.

TABLE 1

| Uplink and downlink configurations | | | | | | | | | | | |
|---|---|---|---|---|---|---|---|---|---|---|---|
| Uplink and downlink configurations | Downlink-to-uplink conversion period | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The following three downlink physical control channels are defined in LTE: a physical control format indicator channel (PCFICH), a physical hybrid automatic retransmission request indicator channel (PHICH) and a physical downlink control channel (PDCCH).

Information borne on the PCFICH is used for indicating the number of orthogonal frequency division multiplexing (OFDM) symbols for transmitting the PDCCH in one sub frame. The information is transmitted on the first OFDM symbol of the subframe, and the frequency location thereof is determined by system downlink bandwidth and cell identity (ID).

The PHICH is used for bearing acknowledgement/non-acknowledgement (ACK/NACK) feedback information of uplink transmission data. The number and time-frequency location of the PHICH may be determined by a system message in a physical broadcast channel (PBCH) of a downlink carrier where the PHICH is located and cell ID.

The PDCCH is used for bearing downlink control information (DCI), including: uplink PUSCH scheduling information, downlink PDSCH scheduling information and uplink power control information.

As regards FDD, when a UE detects in subframe n a PDCCH channel which bears PUSCH scheduling information and belongs to the UE, or the UE receives in subframe n a PHICH corresponding to the PUSCH which belongs to the UE, the UE will transmit PUSCH data in subframe n+4 according to situations.

As regards TDD uplink and downlink configurations 1-6, when a UE detects in subframe n a PDCCH channel which bears PUSCH scheduling information and belongs to the UE, or the UE receives in subframe n a PHICH corresponding to the PUSCH which belongs to the UE, the UE will transmit PUSCH data in subframe n+k according to situations. As regards TDD uplink and downlink configuration 0, when a UE detects in subframe n a PDCCH channel which bears PUSCH scheduling information and belongs to the UE and the high bit of UL Index signalling in the scheduling information is 1, or when the UE receives in subframe 0 a PHICH corresponding to the PUSCH which belongs to the UE and subframe 5 and IPHICH=0, the UE will transmit PUSCH data in subframe n+k according to situations. When a UE detects in subframe n a PDCCH channel which bears PUSCH scheduling information and belongs to the UE and the low bit of UL Index signalling in the scheduling information is 1, or when the UE receives in subframe 0 and subframe 5 a PHICH corresponding to the PUSCH which belongs to the UE and IPHICH=1, the UE will transmit PUSCH data in subframe n+7 according to situations. The value of k above is as shown in Table 2.

TABLE 2

Schematic table of values of k corresponding to TDD configurations 0-6

| TDD Uplink and downlink configurations | Downlink subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

When the PUSCH is transmitted on subframe n, the UE will detect corresponding PHICH resources on downlink subframe n+kPHICH. As regards FDD, kPHICH is 4, and as regards TDD, kPHICH is determined according to Table 3.

TABLE 3

Schematic table of values of kPHICH corresponding to TDD

| TDD Uplink and downlink configurations | Uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

As regards FDD, PDSCH ACK/NACK transmitted on downlink subframe n−4 is fed back on uplink subframe n. As regards TDD, PDSCH ACK/NACK transmitted on downlink subframe n−h is fed back on uplink subframe n, where h∈K, and K is defined in Table 4.

TABLE 4

Downlink subframe set corresponding to TDD K: $\{k_0, k_1, \ldots k_{M-1}\}$

| TDD Uplink and downlink configurations | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | TBD | — | — | — | — | — | — | — |
| 6 | — | — | 7 | 7 | 5 | — | — | 7 | 7 | — |

Since the LTE-Advanced network needs to be able to access an LTE user, its operation frequency band needs to cover the present LTE frequency band. On this frequency range, there is no allocable continuous frequency spectrum bandwidth of 100 MHz, and thus one direct technique needing to be solved in LTE-Advanced is to aggregate several continuous component carriers (CCs) (frequency spectrums) distributed on different frequency ranges using the technique of carrier aggregation, forming bandwidth of 100 MHz capable of being used by LTE-Advanced. That is to say, as regards an aggregated frequency spectrum, it is divided into n component carriers (frequency spectrums), and the frequency spectrum inside each component carrier (frequency spectrum) is continuous.

As regards the problem of relatively low frequency spectrum utilization of data transmission in carrier aggregation scenarios in multiple different systems in the relevant technology, there is still no effective solution proposed at present.

SUMMARY

The embodiments of the disclosure provide a method and apparatus for data transmission, so as to at least solve the problem of relatively low frequency spectrum utilization of data transmission in carrier aggregation scenarios in multiple different systems in the relevant technology mentioned above.

According to an embodiment of the disclosure, a method for data transmission is provided, including: performing frequency spectrum aggregation on multiple first frequency spectrums corresponding to multiple systems; and transmitting data on a second frequency spectrum formed through the frequency spectrum aggregation performed on the multiple first frequency spectrums.

In the described embodiment, transmitting data on the second frequency spectrum formed through the frequency spectrum aggregation performed on the multiple first frequency spectrums includes: transmitting data of a physical data channel on the second frequency spectrum according to a timing relationship of a system corresponding to a first frequency spectrum where the physical data channel is located; or transmitting data of a physical data channel on the second frequency spectrum according to a timing relationship of a system corresponding to a first frequency spectrum where scheduling information corresponding to the physical data channel is located.

In the described embodiment, transmitting the data of the physical data channel on the second frequency spectrum according to the timing relationship of the system corresponding to the first frequency spectrum where the physical data channel is located includes: when the second frequency spectrum is the frequency spectrum aggregation of frequency spectrums of time division duplex (TDD) systems with multiple different uplink and downlink configurations, transmitting the data of the physical data channel according to a timing relationship corresponding to a TDD system with an uplink and downlink configuration of the first frequency spectrum where the physical data channel is located; and transmitting the data of the physical data channel on the second frequency spectrum according to the timing relationship of the system corresponding to the first frequency spectrum where the scheduling information corresponding to the physical data channel is located includes: when the second frequency spectrum is the frequency spectrum aggregation of frequency spectrums of multiple TDD systems with different uplink and downlink configurations, transmitting the data of the physical data channel according to a timing relationship corresponding to a TDD system with an uplink and downlink configuration of the first frequency spectrum where the scheduling information corresponding to the physical data channel is located.

In the described embodiment, transmitting the data of the physical data channel on the second frequency spectrum according to the timing relationship of the system corresponding to the first frequency spectrum where the physical data channel is located includes: when the second frequency spectrum is the frequency spectrum aggregation of multiple frequency spectrums of different communication systems, transmitting the data of the physical data channel according to a timing relationship of a communication system corresponding to the first frequency spectrum where the physical data channel is located; and transmitting the data of the physical data channel on the second frequency spectrum according to the timing relationship of the system corresponding to the first frequency spectrum where the scheduling information corresponding to the physical data channel is located includes: when the second frequency spectrum is the frequency spectrum aggregation of multiple frequency spectrums of different communication systems, transmitting the data of the physical data channel according to a timing relationship of a communication system corresponding to the first frequency spectrum where the scheduling information corresponding to the physical data channel is located; wherein the communication systems include two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI) and an institute of electrical and electronics engineers (IEEE) 802.16e/m/n system.

In the described embodiment, transmitting the data of the physical data channel on the second frequency spectrum according to the timing relationship of the system corresponding to the first frequency spectrum where the physical data channel is located includes: when the second frequency spectrum is the frequency spectrum aggregation of frequency spectrums of a TDD system and a frequency division duplex (FDD) system, transmitting the data of the physical data channel according to a timing relationship of a TDD system or FDD system to which the first frequency spectrum, where the physical data channel is located, belongs; and transmitting the data of the physical data channel on the second frequency spectrum according to the timing relationship of the system corresponding to the first frequency spectrum where the scheduling information corresponding to the physical data channel is located includes: when the second frequency spectrum is the frequency spectrum aggregation of frequency spectrums of a TDD system and an FDD system, transmitting the data of the physical data channel according to a timing relationship of a TDD system or FDD system to which the first frequency spectrum, where the scheduling information corresponding to the physical data channel is located, belongs.

In the described embodiment, transmitting the data on the second frequency spectrum formed through the frequency spectrum aggregation performed on the multiple first frequency spectrums includes: transmitting acknowledgement/non-acknowledgement (ACK/NACK) information corresponding to a physical data channel on the second frequency spectrum according to a timing relationship of a system corresponding to a first frequency spectrum where the physical data channel is located; or transmitting ACK/NACK information corresponding to a physical data channel on the second frequency spectrum according to a timing relationship of a first frequency spectrum where scheduling information corresponding to the physical data channel is located; or transmitting ACK/NACK information corresponding to a physical data channel on the second frequency spectrum according to a timing relationship of a first frequency spectrum where the ACK/NACK information is located.

In the described embodiment, transmitting the ACK/NACK information corresponding to the physical data channel on the second frequency spectrum according to the timing relationship of the system corresponding to the first frequency spectrum where the physical data channel is located includes: when the second frequency spectrum is the frequency spectrum aggregation of frequency spectrums of multiple TDD systems with different uplink and downlink configurations, transmitting the ACK/NACK information according to a timing relationship corresponding to a TDD system with an uplink and downlink configuration of the first frequency spectrum where the physical data channel is located; transmitting the ACK/NACK information corresponding to the physical data channel on the second frequency spectrum according to the timing relationship of the first frequency spectrum where the scheduling information corresponding to the physical data channel is located includes: when the second frequency spectrum is the frequency spectrum aggregation of frequency spectrums of multiple TDD systems with different uplink and downlink configurations, transmitting the ACK/NACK information corresponding to the physical data channel according to a timing relationship corresponding to a TDD system with an uplink and downlink configuration of the first frequency spectrum where the scheduling information corresponding to the physical data channel is located; and transmitting the ACK/NACK information corresponding to the physical data channel on the second frequency spectrum according to the timing relationship of the first frequency spectrum where the ACK/NACK information is located includes: when the second frequency spectrum is the frequency spectrum aggregation of frequency spectrums of multiple TDD systems with different uplink and downlink configurations, transmitting the ACK/NACK information corresponding to the physical data channel according to a timing relationship corresponding to a TDD system with an uplink and downlink configuration of the first frequency spectrum where the ACK/NACK information is located.

In the described embodiment, transmitting the ACK/NACK information corresponding to the physical data channel on the second frequency spectrum according to the timing relationship of the system corresponding to the first frequency spectrum where the physical data channel is located includes: when the second frequency spectrum is the frequency spectrum aggregation of multiple frequency spectrums of different communication systems, transmitting the ACK/NACK information according to a timing relationship of a communication system corresponding to the first frequency spectrum where the spectrum of the physical data channel is located; transmitting the ACK/NACK information corresponding to the physical data channel on the second frequency spectrum according to the timing relationship of the first frequency spectrum where the scheduling information corresponding to the physical data channel is located includes: when the second frequency spectrum is the frequency spectrum aggregation of multiple frequency spectrums of different communication systems, transmitting the ACK/NACK information according to a timing relationship of a communication system corresponding to the first frequency spectrum where the corresponding scheduling information of the physical data channel corresponding to the ACK/NACK information is located; and transmitting the ACK/NACK information corresponding to the physical data channel on the second frequency spectrum according to the timing relationship of the first frequency spectrum where the ACK/NACK information is located includes: when the second frequency spectrum is the frequency spectrum aggregation of multiple frequency spectrums of different communication systems, transmitting the ACK/NACK information according to a timing relationship of a communication system corresponding to the first frequency spectrum where the ACK/NACK information is located; wherein the communication systems include two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system.

In the described embodiment, transmitting the ACK/NACK information corresponding to the physical data channel on the second frequency spectrum according to the timing relationship of the system corresponding to the first frequency spectrum where the physical data channel is located includes: when the second frequency spectrum is the frequency spectrum aggregation of frequency spectrums of a TDD system and an FDD system, transmitting the ACK/NACK information according to a timing relationship of a TDD system or FDD system to which the first frequency spectrum, where the physical data channel is located, belongs; transmitting the ACK/NACK information corresponding to the physical data channel on the second frequency spectrum according to the timing relationship of the first frequency spectrum where the scheduling information corresponding to the physical data channel is located includes: when the second frequency spectrum is the frequency spectrum aggregation of frequency spectrums of a TDD system and an FDD system, transmitting the ACK/NACK information according to a timing relationship of a TDD system or FDD system to which the first frequency spectrum, where the scheduling information corresponding to the physical data channel is located, belongs; transmitting the ACK/NACK information corresponding to the physical data channel on the second frequency spectrum according to the timing relationship of the first frequency spectrum where the ACK/NACK information is located includes: when the second frequency spectrum is the frequency spectrum aggregation of frequency spectrums of a time division duplex (TDD) system and a frequency division duplex (FDD) system, transmitting the ACK/NACK information according to a timing relationship of a TDD system or FDD system to which the first frequency spectrum, where the ACK/NACK information is located, belongs.

In the described embodiment, transmitting the data on the second frequency spectrum formed through the frequency spectrum aggregation performed on the multiple first frequency spectrums includes: transmitting data of a retransmission data channel of the second frequency spectrum according to a timing relationship corresponding to a first frequency spectrum where a data channel of first transmission of the retransmission data channel is located; or transmitting data of a retransmission data channel of the second frequency spectrum according to a timing relationship corresponding to a first frequency spectrum where scheduling information corresponding to the retransmission data channel is located; or transmitting data of a retransmission data channel of the second frequency spectrum according to a timing relationship corresponding to a first frequency spectrum where ACK/NACK information of a previous transmission block corresponding to the retransmission data channel is located; or transmitting data of a retransmission data channel of the second frequency spectrum according to a timing relationship corresponding to a first frequency spectrum where data retransmitted last time on the retransmission data channel is located; or transmitting data of a retransmission data channel of the second frequency spectrum according to a timing relationship corresponding to a first frequency spectrum where the retransmission data channel is located.

In the described embodiment, transmitting the data of the retransmission data channel of the second frequency spectrum according to the timing relationship corresponding to the first frequency spectrum where the data channel of the first transmission of the retransmission data channel is located includes: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where the data channel of the first transmission is located; transmitting the data of the retransmission data channel of the second frequency spectrum according to the timing relationship corresponding to the first frequency spectrum where the scheduling information corresponding to the retransmission data channel is located includes: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum to which the spectrum, where the scheduling information corresponding to the retransmission data channel is located, belongs; transmitting the data of the retransmission data channel of the second frequency spectrum according to the timing relationship corresponding to the first frequency spectrum where the ACK/NACK information of the previous transmission block corresponding to the retransmission data channel is located includes: when the second frequency spectrum is the frequency spectrum aggregation of frequency spectrums of multiple TDD systems with different uplink and downlink configurations, transmitting data of the retransmission data channel according to a timing relationship corresponding to a TDD system with an uplink and downlink configuration of the first frequency spectrum where ACK/NACK information of the previous transmission block corresponding to the retransmission data channel is located; transmitting the data of the retransmission data channel of the second frequency spectrum according to the timing relationship corresponding to the first frequency spectrum where data retransmitted last time on the retransmission data channel is located includes: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where data retransmitted last time on the retransmission data channel is located; transmitting the data of the retransmission data channel of the second frequency spectrum according to the timing relationship corresponding to the first frequency spectrum where the retransmission data channel is located includes: when the second frequency spectrum is the frequency spectrum aggregation of frequency spectrums of multiple TDD systems with different uplink and downlink configurations, transmitting data of the retransmission data channel according to a timing relationship corresponding to the first frequency spectrum where the retransmission data channel is located.

In the described embodiment, transmitting the data of the retransmission data channel of the second frequency spectrum according to the timing relationship corresponding to the first frequency spectrum where the data channel of the first transmission of the retransmission data channel is located includes: when the second frequency spectrum is the frequency spectrum aggregation of multiple frequency spectrums of different communication systems, transmitting data of the retransmission data channel according to a timing relationship of a communication system corresponding to the first frequency spectrum where the data channel of the first transmission of the retransmission data channel is located; transmitting the data of the retransmission data channel of the second frequency spectrum according to the timing relationship corresponding to the first frequency spectrum where the scheduling information corresponding to the retransmission data channel is located includes: when the second frequency spectrum is the frequency spectrum aggregation of multiple frequency spectrums of different communication systems, transmitting data of the retransmission data channel according to a timing relationship of a communication system corresponding to the first frequency spectrum where the scheduling information corresponding to the retransmission data channel is located; transmitting the data of the retransmission data channel of the second frequency spectrum according to the timing relationship corresponding to the first frequency spectrum where the ACK/NACK information of the previous transmission block corresponding to the retransmission data channel is located includes: when the second frequency spectrum is the frequency spectrum aggregation of multiple frequency spectrums of different communication systems, transmitting data of the retransmission data channel according to a timing relationship corresponding to a different communication system to which the ACK/NACK information of the previous transmission block corresponding to the retransmission data channel belongs; transmitting the data of the retransmission data channel of the second frequency spectrum according to the timing relationship corresponding to the first frequency spectrum where the data retransmitted last time on the retransmission data channel is located includes: when the second frequency spectrum is the frequency spectrum aggregation of multiple frequency spectrums of different communication systems, transmitting data of the retransmission data channel according to a timing relationship of a communication system corresponding to the first frequency spectrum where the data retransmitted last time on the retransmission data channel is located; transmitting the data of the retransmission data channel of the second frequency spectrum according to the timing relationship corresponding to the first frequency spectrum where the retransmission data channel is located includes: when the second frequency spectrum is the frequency spectrum aggregation of multiple frequency spectrums of different communication systems, transmitting data of the retransmission data channel according to a timing relationship of a communication system corresponding to the first frequency spectrum where the retransmission data channel is located; wherein the communication systems include two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system.

In the described embodiment, transmitting the data of the retransmission data channel of the second frequency spectrum according to the timing relationship corresponding to the first frequency spectrum where the data channel of the first transmission of the retransmission data channel is located includes: when the second frequency spectrum is the frequency spectrum aggregation of frequency spectrums of a time division duplex (TDD) system and a frequency division duplex (FDD) system, transmitting data of the retransmission data channel according to a timing relationship of a TDD system or FDD system to which the first frequency spectrum, where a data channel of the first transmission is located, belongs; transmitting the data of the retransmission data channel of the second frequency spectrum according to the timing relationship corresponding to the first frequency spectrum where the scheduling information corresponding to the retransmission data channel is located includes: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where the scheduling information corresponding to the retransmission data channel is located, belongs; transmitting the data of the retransmission data channel of the second frequency spectrum according to the timing relationship corresponding to the first frequency spectrum where the ACK/NACK information of the previous transmission block corresponding to the retransmission data channel is located includes: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where the ACK/NACK information of the previous transmission block corresponding to the retransmission data channel is located, belongs; transmitting the data of the retransmission data channel of the second frequency spectrum according to the timing relationship corresponding to the first frequency spectrum where the data retransmitted last time on the retransmission data channel is located includes: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where data retransmitted last time on the retransmission data channel is located, belongs; transmitting the data of the retransmission data channel of the second frequency spectrum according to the timing relationship corresponding to the first frequency spectrum where the retransmission data channel is located includes: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where the retransmission data channel is located, belongs.

In the described embodiment, the second frequency spectrum is a group of frequency spectrums or the second frequency spectrum is divided into multiple frequency spectrum groups according to a predetermined rule, wherein each frequency spectrum group corresponds to one primary frequency spectrum (PCC).

In the described embodiment, dividing the second frequency spectrum into multiple frequency spectrum groups according to a predetermined rule includes one of the following: dividing the second frequency spectrum according to different communication systems, wherein first frequency spectrums with the same communication system are divided into one frequency spectrum group; dividing the second frequency spectrum into two frequency spectrum groups according to an FDD system and a TDD system, the two frequency spectrum groups respectively being an FDD system frequency spectrum group and a TDD system frequency spectrum group; dividing the second frequency spectrum into multiple frequency spectrum groups according to signalling configurations; and dividing the second frequency spectrum depending on whether frequency spectrums are continuous, wherein each section of continuous frequency spectrum forms one frequency spectrum group.

According to another embodiment of the disclosure, an apparatus for data transmission is provided, including: a frequency spectrum aggregation module, configured to perform frequency spectrum aggregation on multiple first frequency spectrums corresponding to multiple systems; and a first transmission module, configured to transmit data on a second frequency spectrum formed through the frequency spectrum aggregation performed on the multiple first frequency spectrums.

In the described embodiment, the first transmission module includes: a second transmission module, configured to transmit data of a physical data channel on the second frequency spectrum according to a timing relationship of a system corresponding to a first frequency spectrum where the physical data channel is located; or a third transmission module, configured to transmit data of a physical data channel on the second frequency spectrum according to a timing relationship of a system corresponding to a first frequency spectrum where scheduling information corresponding to the physical data channel is located.

In the described embodiment, the second transmission module includes: a first processing module, configured to, when the second frequency spectrum is the frequency spectrum aggregation of frequency spectrums of time division duplex (TDD) systems with multiple different uplink and downlink configurations, transmit the data of the physical data channel according to a timing relationship corresponding to a TDD system with an uplink and downlink configuration of the first frequency spectrum where the physical data channel is located; the third transmission module includes: a second processing module, configured to, when the second frequency spectrum is the frequency spectrum aggregation of frequency spectrums of multiple TDD systems with different uplink and downlink configurations, transmit the data of the physical data channel according to a timing relationship corresponding to a TDD system with an uplink and downlink configuration of the first frequency spectrum where the scheduling information corresponding to the physical data channel is located.

In the described embodiment, the second transmission module includes: a third processing module, configured to, when the second frequency spectrum is the frequency spectrum aggregation of multiple frequency spectrums of different communication systems, transmit the data of the physical data channel according to a timing relationship of a communication system corresponding to the first frequency spectrum where the physical data channel is located; the third transmission module includes: a fourth processing module, configured to, when the second frequency spectrum is the frequency spectrum aggregation of multiple frequency spectrums of different communication systems, transmit the data of the physical data channel according to a timing relationship of a communication system corresponding to the first frequency spectrum where the scheduling information corresponding to the physical data channel is located; wherein the communication systems include two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI) and an IEEE 802.16e/m/n system.

In the described embodiment, the second transmission module includes: a fifth processing module, configured to, when the second frequency spectrum is the frequency spectrum aggregation of frequency spectrums of a TDD system and a frequency division duplex (FDD) system, transmit the data of the physical data channel according to a timing relationship of a TDD system or FDD system to which the first frequency spectrum, where the physical data channel is located, belongs; the third transmission module includes: a sixth processing module, configured to, when the second frequency spectrum is the frequency spectrum aggregation of frequency spectrums of a TDD system and an FDD system, transmit the data of the physical data channel according to a timing relationship of a TDD system or FDD system to which the first frequency spectrum, where the scheduling information corresponding to the physical data channel is located, belongs.

In the described embodiment, the first transmission module includes: a fourth transmission module, configured to transmit acknowledgement/non-acknowledgement (ACK/NACK) information corresponding to a physical data channel on the second frequency spectrum according to a timing relationship of a system corresponding to a first frequency spectrum where the physical data channel is located; or a fifth transmission module, configured to transmit ACK/NACK information corresponding to a physical data channel on the second frequency spectrum according to a timing relationship of a first frequency spectrum where scheduling information corresponding to the physical data channel is located; or a sixth transmission module, configured to transmit ACK/NACK information corresponding to a physical data channel on the second frequency spectrum according to a timing relationship of a first frequency spectrum where the ACK/NACK information is located.

In the described embodiment, the fourth transmission module includes: a seventh processing module, configured to, when the second frequency spectrum is the frequency spectrum aggregation of frequency spectrums of multiple TDD systems with different uplink and downlink configurations, transmit the ACK/NACK information according to a timing relationship corresponding to a TDD system with an uplink and downlink configuration of the first frequency spectrum where the physical data channel is located; the fifth transmission module includes: an eighth processing module, configured to, when the second frequency spectrum is the frequency spectrum aggregation of frequency spectrums of multiple TDD systems with different uplink and downlink configurations, transmit the ACK/NACK information corresponding to the physical data channel according to a timing relationship corresponding to a TDD system with an uplink and downlink configuration of the first frequency spectrum where the scheduling information corresponding to the physical data channel is located; the sixth transmission module includes: a ninth processing module, configured to, when the second frequency spectrum is the frequency spectrum aggregation of frequency spectrums of multiple TDD systems with different uplink and downlink configurations, transmit the ACK/NACK information corresponding to the physical data channel according to a timing relationship corresponding to a TDD system with an uplink and downlink configuration of the first frequency spectrum where the ACK/NACK information is located.

In the described embodiment, the fourth transmission module includes: a tenth processing module, configured to, when the second frequency spectrum is the frequency spectrum aggregation of multiple frequency spectrums of different communication systems, transmit the ACK/NACK information according to a timing relationship of a communication system corresponding to the first frequency spectrum where the spectrum of the physical data channel is located; the fifth transmission module includes: an eleventh processing module, configured to, when the second frequency spectrum is the frequency spectrum aggregation of multiple frequency spectrums of different communication systems, transmit the ACK/NACK information according to a timing relationship of a communication system corresponding to the first frequency spectrum where the corresponding scheduling information of the physical data channel corresponding to the ACK/NACK information is located; the sixth transmission module includes: a twelfth processing module, configured to, when the second frequency spectrum is the frequency spectrum aggregation of multiple frequency spectrums of different communication systems, transmit the ACK/NACK information according to a timing relationship of a communication system corresponding to the first frequency spectrum where the ACK/NACK information is located; wherein the communication systems include two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, a UMB system, a time division-synchronous code division multiple access (TD-SCDMA) system, wireless fidelity (WIFI) and an IEEE 802.16e/m/n system.

In the described embodiment, the fourth transmission module includes: a thirteenth processing module, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the physical data channel is located, belongs; the fifth transmission module includes: a fourteenth processing module, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the scheduling information corresponding to the physical data channel is located, belongs; the sixth transmission module includes: a fifteenth processing module, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the ACK/NACK information is located, belongs.

In the described embodiment, the first transmission module includes: a seventh transmission module, configured to transmit data of a retransmission data channel of the second frequency spectrum according to a timing relationship corresponding to a first frequency spectrum where a data channel of first transmission of the retransmission data channel is located; or an eighth transmission module, configured to transmit data of a retransmission data channel of the second frequency spectrum according to a timing relationship corresponding to a first frequency spectrum where scheduling information corresponding to the retransmission data channel is located; or a ninth transmission module, configured to transmit data of a retransmission data channel of the second frequency spectrum according to a timing relationship corresponding to a first frequency spectrum where ACK/NACK information of a previous transmission block corresponding to the retransmission data channel is located; or, a tenth transmission module, configured to transmit data of a retransmission data channel of the second frequency spectrum according to a timing relationship corresponding to a first frequency spectrum where data retransmitted last time on the retransmission data channel is located; or an eleventh transmission module, configured to transmit data of a retransmission data channel of the second frequency spectrum according to a timing relationship corresponding to a first frequency spectrum where the retransmission data channel is located.

In the described embodiment, the seventh transmission module includes: a sixteenth processing module, configured to transmit the data of the retransmission data channel of the second frequency spectrum according to the timing relationship corresponding to the first frequency spectrum where the data channel of the first transmission of the retransmission data channel is located in the following manner: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where the data channel of the first transmission is located; the eighth transmission module includes: a seventeenth processing module, configured to, when the second frequency spectrum is the frequency spectrum aggregation of frequency spectrums of time division duplex (TDD) systems with multiple different uplink and downlink configurations, transmit data of the retransmission data channel according to a timing relationship of a TDD system with an uplink and downlink configuration of the first frequency spectrum to which the spectrum, where the scheduling information corresponding to the retransmission data channel is located, belongs; the ninth transmission module includes: an eighteenth processing module, configured to, when the second frequency spectrum is the frequency spectrum aggregation of frequency spectrums of time division duplex (TDD)

systems with multiple different uplink and downlink configurations, transmit data of the retransmission data channel according to a timing relationship corresponding to a TDD system with an uplink and downlink configuration of the first frequency spectrum where ACK/NACK information of the previous transmission block corresponding to the retransmission data channel is located; the tenth transmission module includes: a nineteenth processing module, configured to, when the second frequency spectrum is the frequency spectrum aggregation of frequency spectrums of time division duplex (TDD) systems with multiple different uplink and downlink configurations, transmit data of the retransmission data channel according to a timing relationship of a TDD system with an uplink and downlink configuration of the first frequency spectrum where data retransmitted last time on the retransmission data channel is located; the eleventh transmission module includes: a twentieth processing module, configured to, when the second frequency spectrum is the frequency spectrum aggregation of frequency spectrums of multiple TDD systems with different uplink and downlink configurations, transmit the data of the retransmission data channel according to a timing relationship corresponding to the first frequency spectrum where the retransmission data channel is located.

In the described embodiment, the seventh transmission module includes: a twenty-first processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the data channel of the first transmission of the retransmission data channel is located; the eighth transmission module includes: a twenty-second processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the scheduling information corresponding to the retransmission data channel is located; the ninth transmission module includes: a twenty-third processing module, configured to, when the second frequency spectrum is the frequency spectrum aggregation of multiple frequency spectrums of different communication systems, transmit the data of the retransmission data channel according to a timing relationship corresponding to a different communication system to which the ACK/NACK information of the previous transmission block corresponding to the retransmission data channel belongs; the tenth transmission module includes: a twenty-fourth processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the data retransmitted last time on the retransmission data channel is located; the eleventh transmission module includes: a twenty-fifth processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the retransmission data channel is located, wherein the communication systems include two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system.

In the described embodiment, the seventh transmission module includes: a twenty-sixth processing module, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where a data channel of the first transmission is located, belongs; the eighth transmission module includes: a twenty-seventh processing module, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where the scheduling information corresponding to the retransmission data channel is located, belongs; the ninth transmission module includes: a twenty-eighth processing module, configured to transmit data of the retransmission data channel according to a timing relationship of a TDD system or FDD system to which the first frequency spectrum, where the ACK/NACK information of the previous transmission block corresponding to the retransmission data channel is located, belongs; the tenth transmission module includes: a twenty-ninth processing module, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where data retransmitted last time on the retransmission data channel is located, belongs; the eleventh transmission module includes: a thirtieth processing module, configured to, when the second frequency spectrum is the frequency spectrum aggregation of frequency spectrums of a TDD system and an FDD system, transmit the data of the retransmission data channel according to a timing relationship of a TDD system or FDD system to which the first frequency spectrum, where the retransmission data channel is located, belongs.

By means of the disclosure, frequency spectrum aggregation is performed on multiple first frequency spectrums corresponding to multiple systems, and data transmission is performed on the aggregated second frequency spectrum. The problem of relatively low frequency spectrum utilization of data transmission in carrier aggregation scenarios in the relevant technology is overcome, thereby achieving the effect of improving the frequency spectrum utilization.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF EMBODIMENTS

The disclosure is described below with reference to the accompanying drawings and embodiments in detail. Note that, the embodiments of the disclosure and the features of the embodiments can be combined with each other if there is no conflict.

Figure 1:
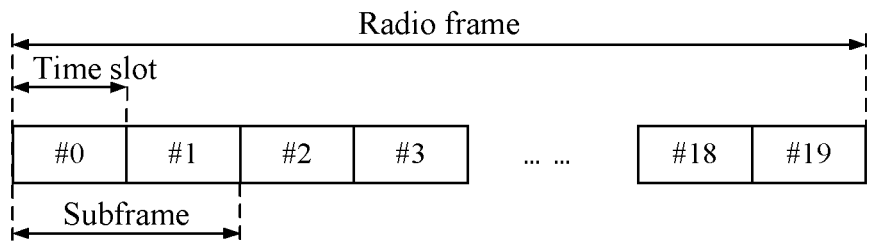
FIG. 1 is a schematic diagram showing the frame structure of an FDD mode according to the relevant technology.
Figure 2:
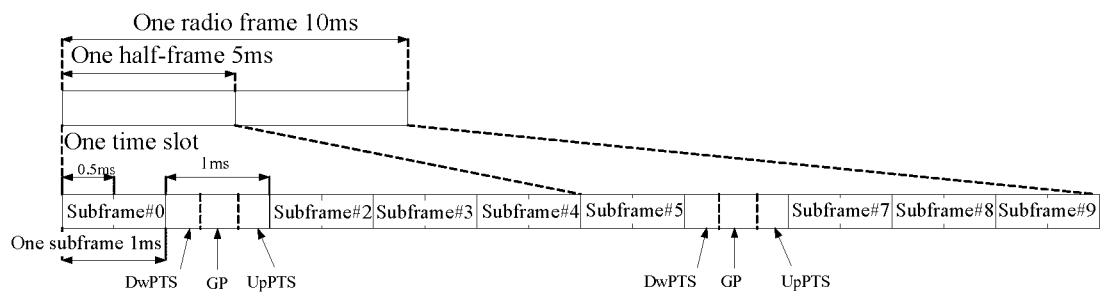
FIG. 2 is a schematic diagram showing the frame structure of an FDD mode according to the relevant technology.
Figures 3, 4, 5:
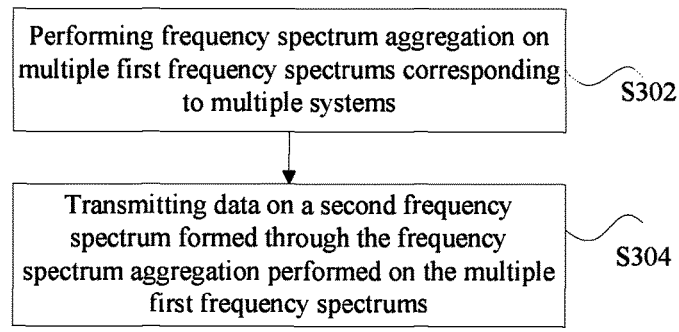
FIG. 3 is a flowchart of a method for data transmission according to an embodiment of the disclosure.
FIG. 4 is schematic diagram I of a timing relationship among PUSCH scheduling information, a PUSCH, PUSCH ACK/NACK and a retransmission PUSCH according to an embodiment of the disclosure.
FIG. 5 is schematic diagram II of a timing relationship among PDSCH scheduling information, a PDSCH, PDSCH ACK/NACK and a retransmission PDSCH according to an embodiment of the disclosure.

This embodiment provides a method for data transmission. FIG. 3 is a flowchart of a method for data transmission according to an embodiment of the disclosure. As shown in FIG. 3, the method includes:

step S302: performing frequency spectrum aggregation on multiple first frequency spectrums corresponding to multiple systems; and step S304: transmitting data on a second frequency spectrum formed through the frequency spectrum aggregation performed on the multiple first frequency spectrums.

By means of the steps above, frequency spectrum aggregation is performed on multiple first frequency spectrums corresponding to multiple systems, and data transmission is performed on the aggregated second frequency spectrum. The problem of relatively low frequency spectrum utilization of data transmission in carrier aggregation scenarios in the relevant technology is overcome, thereby achieving the effect of improving the frequency spectrum utilization.

In the described embodiment, one implementation of step S304 will be described below. Transmitting data on a second frequency spectrum formed through the frequency spectrum aggregation performed on the multiple first frequency spectrums includes: transmitting data of a physical data channel on the second frequency spectrum according to a timing relationship of a system corresponding to a first frequency spectrum where the physical data channel is located; or transmitting data of a physical data channel on the second frequency spectrum according to a timing relationship of a system corresponding to a first frequency spectrum where scheduling information corresponding to the physical data channel is located.

In the described embodiment, the above-mentioned transmitting data of a physical data channel on the second frequency spectrum according to a timing relationship of a system corresponding to a first frequency spectrum where the physical data channel is located includes: when the second frequency spectrum is frequency spectrum aggregation of frequency spectrums of time division duplex (TDD) systems with multiple different uplink and downlink configurations, transmitting data of the physical data channel according to a timing relationship corresponding to a TDD system with an uplink and downlink configuration of the first frequency spectrum where the physical data channel is located. In the described embodiment, transmitting data of a physical data channel on the second frequency spectrum according to a timing relationship of a system corresponding to a first frequency spectrum where scheduling information corresponding to the physical data channel is located includes: when the second frequency spectrum is frequency spectrum aggregation of frequency spectrums of multiple TDD systems with different uplink and downlink configurations, transmitting data of the physical data channel according to a timing relationship corresponding to a TDD system with an uplink and downlink configuration of the first frequency spectrum where the scheduling information corresponding to the physical data channel is located.

In the described embodiment, the above-mentioned transmitting data of a physical data channel on the second frequency spectrum according to a timing relationship of a system corresponding to a first frequency spectrum where the physical data channel is located includes: when the second frequency spectrum is frequency spectrum aggregation of multiple frequency spectrums of different communication systems, transmitting data of the physical data channel according to a timing relationship of a communication system corresponding to the first frequency spectrum where the physical data channel is located. In the described embodiment, transmitting data of a physical data channel on the second frequency spectrum according to a timing relationship of a system corresponding to a first frequency spectrum where scheduling information corresponding to the physical data channel is located includes: when the second frequency spectrum is frequency spectrum aggregation of multiple frequency spectrums of different communication systems, transmitting data of the physical data channel according to a timing relationship of a communication system corresponding to the first frequency spectrum where the scheduling information corresponding to the physical data channel is located. In the above described embodiment, the communication systems include two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI) and an institute of electrical and electronics engineers (IEEE) 802.16e/m/n system.

In the described embodiment, the above-mentioned transmitting data of a physical data channel on the second frequency spectrum according to a timing relationship of a system corresponding to a first frequency spectrum where the physical data channel is located includes: when the second frequency spectrum is frequency spectrum aggregation of frequency spectrums of a TDD system and a frequency division duplex (FDD) system, transmitting data of the physical data channel according to a timing relationship of a TDD system or FDD system to which the first frequency spectrum, where the physical data channel is located, belongs. In the described embodiment, transmitting data of a physical data channel on the second frequency spectrum according to a timing relationship of a system corresponding to a first frequency spectrum where scheduling information corresponding to the physical data channel is located includes: when the second frequency spectrum is frequency spectrum aggregation of frequency spectrums of a TDD system and an FDD system, transmitting data of the physical data channel according to a timing relationship of a TDD system or FDD system to which the first frequency spectrum, where the scheduling information corresponding to the physical data channel is located, belongs.

In the described embodiment, another implementation of step S304 will be described below. Transmitting data on a second frequency spectrum formed through the frequency spectrum aggregation includes: transmitting acknowledgement/non-acknowledgement (ACK/NACK) information corresponding to a physical data channel on the second frequency spectrum according to a timing relationship of a system corresponding to a first frequency spectrum where the physical data channel is located; or transmitting ACK/NACK information corresponding to a physical data channel on the second frequency spectrum according to a timing relationship of a first frequency spectrum where scheduling information corresponding to the physical data channel is located; or transmitting ACK/NACK information corresponding to a physical data channel on the second frequency spectrum according to a timing relationship of a first frequency spectrum where the ACK/NACK information is located.

In the described embodiment, the above-mentioned transmitting ACK/NACK information corresponding to a physical data channel on the second frequency spectrum according to a timing relationship of a system corresponding to a first frequency spectrum where the physical data channel is located includes: when the second frequency spectrum is frequency spectrum aggregation of frequency spectrums of multiple TDD systems with different uplink and downlink configurations, transmitting the ACK/NACK information according to a timing relationship corresponding to a TDD system with an uplink and downlink configuration of the first frequency spectrum where the physical data channel is located. In the described embodiment, transmitting ACK/NACK information corresponding to a physical data channel on the second frequency spectrum according to a timing relationship of a first frequency spectrum where scheduling information corresponding to the physical data channel is located includes: when the second frequency spectrum is frequency spectrum aggregation of frequency spectrums of multiple TDD systems with different uplink and downlink configurations, transmitting the ACK/NACK information corresponding to the physical data channel according to a timing relationship corresponding to a TDD system with an uplink and downlink configuration of the first frequency spectrum where the scheduling information corresponding to the physical data channel is located. In the described embodiment, transmitting ACK/NACK information corresponding to a physical data channel on the second frequency spectrum according to a timing relationship of a first frequency spectrum where the ACK/NACK information is located includes: when the second frequency spectrum is frequency spectrum aggregation of frequency spectrums of multiple TDD systems with different uplink and downlink configurations, transmitting the ACK/NACK information corresponding to the physical data channel according to a timing relationship corresponding to a TDD system with an uplink and downlink configuration of the first frequency spectrum where the ACK/NACK information is located.

In the described embodiment, the above-mentioned transmitting ACK/NACK information corresponding to a physical data channel on the second frequency spectrum according to a timing relationship of a system corresponding to a first frequency spectrum where the physical data channel is located includes: when the second frequency spectrum is frequency spectrum aggregation of multiple frequency spectrums of different communication systems, transmitting the ACK/NACK information according to a timing relationship of a communication system corresponding to the first frequency spectrum where the spectrum of the physical data channel is located. In the described embodiment, transmitting ACK/NACK information corresponding to a physical data channel on the second frequency spectrum according to a timing relationship of a first frequency spectrum where scheduling information corresponding to the physical data channel is located includes: when the second frequency spectrum is frequency spectrum aggregation of multiple frequency spectrums of different communication systems, transmitting the ACK/NACK information according to a timing relationship of a communication system corresponding to the first frequency spectrum where the corresponding scheduling information of the physical data channel corresponding to the ACK/NACK information is located. In the described embodiment, transmitting ACK/NACK information corresponding to a physical data channel on the second frequency spectrum according to a timing relationship of a first frequency spectrum where the ACK/NACK information is located includes: when the second frequency spectrum is frequency spectrum aggregation of multiple frequency spectrums of different communication systems, transmitting the ACK/NACK information according to a timing relationship of a communication system corresponding to the first frequency spectrum where the ACK/NACK information is located. In the above mentioned embodiment, the communication systems include two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system.

In the described embodiment, the above-mentioned transmitting acknowledgement/non-acknowledgement (ACK/NACK) information corresponding to a physical data channel on the second frequency spectrum according to a timing relationship of a system corresponding to a first frequency spectrum where the physical data channel is located includes: when the second frequency spectrum is frequency spectrum aggregation of frequency spectrums of a TDD system and an FDD system, transmitting the ACK/NACK information according to a timing relationship of a TDD system or FDD system to which the first frequency spectrum, where the physical data channel is located, belongs. In the described embodiment, transmitting ACK/NACK information corresponding to a physical data channel on the second frequency spectrum according to a timing relationship of a first frequency spectrum where scheduling information corresponding to the physical data channel is located includes: when the second frequency spectrum is frequency spectrum aggregation of frequency spectrums of a TDD system and an FDD system, transmitting the ACK/NACK information according to a timing relationship of a TDD system or FDD system to which the first frequency spectrum, where the scheduling information corresponding to the physical data channel is located, belongs. In the described embodiment, transmitting ACK/NACK information corresponding to a physical data channel on the second frequency spectrum according to a timing relationship of a first frequency spectrum where the ACK/NACK information is located includes: when the second frequency spectrum is frequency spectrum aggregation of frequency spectrums of a TDD system and an FDD system, transmitting the ACK/NACK information according to a timing relationship of a TDD system or FDD system to which the first frequency spectrum, where the ACK/NACK information is located, belongs.

In the described embodiment, another implementation of step S304 will be described below. Transmitting data on a second frequency spectrum formed through the frequency spectrum aggregation includes: transmitting data of a retransmission data channel of the second frequency spectrum according to a timing relationship corresponding to a first frequency spectrum where a data channel of the first transmission of the retransmission data channel is located; or transmitting data of a retransmission data channel of the second frequency spectrum according to a timing relationship corresponding to a first frequency spectrum where scheduling information corresponding to the retransmission data channel is located; or transmitting data of a retransmission data channel of the second frequency spectrum according to a timing relationship corresponding to a first frequency spectrum where ACK/NACK information of a previous transmission block corresponding to the retransmission data channel is located; or transmitting data of a retransmission data channel of the second frequency spectrum according to a timing relationship corresponding to a first frequency spectrum where data retransmitted last time on the retransmission data channel is located; or transmitting data of a retransmission data channel of the second frequency spectrum according to a timing relationship corresponding to a first frequency spectrum where the retransmission data channel is located.

In the described embodiment, the above-mentioned transmitting data of a retransmission data channel of the second frequency spectrum according to a timing relationship corresponding to a first frequency spectrum where a data channel of the first transmission of the retransmission data channel is located includes: when the second frequency spectrum is frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where the data channel of the first transmission is located. In the described embodiment, transmitting data of a retransmission data channel of the second frequency spectrum according to a timing relationship corresponding to a first frequency spectrum where scheduling information corresponding to the retransmission data channel is located includes: when the second frequency spectrum is frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum to which the spectrum, where the scheduling information corresponding to the retransmission data channel is located, belongs. In the described embodiment, transmitting data of a retransmission data channel of the second frequency spectrum according to a timing relationship corresponding to a first frequency spectrum where ACK/NACK information of a previous transmission block corresponding to the retransmission data channel is located includes: when the second frequency spectrum is frequency spectrum aggregation of frequency spectrums of multiple TDD systems with different uplink and downlink configurations, transmitting data of the retransmission data channel according to a timing relationship corresponding to a TDD system with an uplink and downlink configuration of the first frequency spectrum where ACK/NACK information of the previous transmission block corresponding to the retransmission data channel is located. In the described embodiment, transmitting data of a retransmission data channel of the second frequency spectrum according to a timing relationship corresponding to a first frequency spectrum where data retransmitted last time on the retransmission data channel is located includes: when the second frequency spectrum is frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where data retransmitted last time on the retransmission data channel is located. In the described embodiment, transmitting data of a retransmission data channel of the second frequency spectrum according to a timing relationship corresponding to a first frequency spectrum where the retransmission data channel is located includes: when the second frequency spectrum is frequency spectrum aggregation of frequency spectrums of multiple TDD systems with different uplink and downlink configurations, transmitting data of the retransmission data channel according to a timing relationship corresponding to the first frequency spectrum where the retransmission data channel is located.

In the described embodiment, the above-mentioned transmitting data of a retransmission data channel of the second frequency spectrum according to a timing relationship corresponding to a first frequency spectrum where a data channel of the first transmission of the retransmission data channel is located includes: when the second frequency spectrum is frequency spectrum aggregation of multiple frequency spectrums of different communication systems, transmitting data of the retransmission data channel according to a timing relationship of a communication system corresponding to the first frequency spectrum where the data channel of the first transmission of the retransmission data channel is located.

In the described embodiment, transmitting data of a retransmission data channel of the second frequency spectrum according to a timing relationship corresponding to a first frequency spectrum where scheduling information corresponding to the retransmission data channel is located includes: when the second frequency spectrum is frequency spectrum aggregation of multiple frequency spectrums of different communication systems, transmitting data of the retransmission data channel according to a timing relationship of a communication system corresponding to the first frequency spectrum where the scheduling information corresponding to the retransmission data channel is located.

In the described embodiment, transmitting data of a retransmission data channel of the second frequency spectrum according to a timing relationship corresponding to a first frequency spectrum where ACK/NACK information of a previous transmission block corresponding to the retransmission data channel is located includes: when the second frequency spectrum is frequency spectrum aggregation of multiple frequency spectrums of different communication systems, transmitting data of the retransmission data channel according to a timing relationship corresponding to a different communication system to which the ACK/NACK information of the previous transmission block corresponding to the retransmission data channel belongs.

In the described embodiment, transmitting data of a retransmission data channel of the second frequency spectrum according to a timing relationship corresponding to a first frequency spectrum where data retransmitted last time on the retransmission data channel is located includes: when the second frequency spectrum is frequency spectrum aggregation of multiple frequency spectrums of different communication systems, transmitting data of the retransmission data channel according to a timing relationship of a communication system corresponding to the first frequency spectrum where the data retransmitted last time on the retransmission data channel is located.

In the described embodiment, transmitting data of a retransmission data channel of the second frequency spectrum according to a timing relationship corresponding to a first frequency spectrum where the retransmission data channel is located includes: when the second frequency spectrum is frequency spectrum aggregation of multiple frequency spectrums of different communication systems, transmitting data of the retransmission data channel according to a timing relationship of a communication system corresponding to the first frequency spectrum where the retransmission data channel is located.

In the described embodiment, the communication systems include two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system.

In the described embodiment, the above-mentioned transmitting data of a retransmission data channel of the second frequency spectrum according to a timing relationship corresponding to a first frequency spectrum where a data channel of the first transmission of the retransmission data channel is located includes: when the second frequency spectrum is frequency spectrum aggregation of frequency spectrums of a time division duplex (TDD) system and a frequency division duplex (FDD) system, transmitting data of the retransmission data channel according to a timing relationship of a TDD system or FDD system to which the first frequency spectrum, where a data channel of the first transmission is located, belongs. In the described embodiment, transmitting data of a retransmission data channel of the second frequency spectrum according to a timing relationship corresponding to a first frequency spectrum where scheduling information corresponding to the retransmission data channel is located includes: when the second frequency spectrum is frequency spectrum aggregation of frequency spectrums of a TDD system and an FDD system, transmitting data of the retransmission data channel according to a timing relationship of a TDD system or FDD system to which the first frequency spectrum, where the scheduling information corresponding to the retransmission data channel is located, belongs. In the described embodiment, transmitting data of a retransmission data channel of the second frequency spectrum according to a timing relationship corresponding to a first frequency spectrum where ACK/NACK information of a previous transmission block corresponding to the retransmission data channel is located includes: when the second frequency spectrum is frequency spectrum aggregation of frequency spectrums of a TDD system and an FDD system, transmitting data of the retransmission data channel according to a timing relationship of a TDD system or FDD system to which the first frequency spectrum, where the ACK/NACK information of the previous transmission block corresponding to the retransmission data channel is located, belongs. In the described embodiment, transmitting data of a retransmission data channel of the second frequency spectrum according to a timing relationship corresponding to a first frequency spectrum where data retransmitted last time on the retransmission data channel is located includes: when the second frequency spectrum is frequency spectrum aggregation of frequency spectrums of a TDD system and an FDD system, transmitting data of the retransmission data channel according to a timing relationship of a TDD system or FDD system to which the first frequency spectrum, where data retransmitted last time on the retransmission data channel is located, belongs. In the described embodiment, transmitting data of a retransmission data channel of the second frequency spectrum according to a timing relationship corresponding to a first frequency spectrum where the retransmission data channel is located includes: when the second frequency spectrum is frequency spectrum aggregation of frequency spectrums of a TDD system and an FDD system, transmitting data of the retransmission data channel according to a timing relationship of a TDD system or FDD system to which the first frequency spectrum, where the retransmission data channel is located, belongs.

In the described embodiment, the second frequency spectrum is a group of frequency spectrums or the second frequency spectrum is divided into multiple frequency spectrum groups according to a predetermined rule, wherein each frequency spectrum group corresponds to one primary frequency spectrum (PCC).

In the described embodiment, the above-mentioned step that the second frequency spectrum is divided into multiple frequency spectrum groups according to a predetermined rule includes one of the following: dividing the second frequency spectrum according to different communication systems, wherein first frequency spectrums with the same communication system are divided into one frequency spectrum group; dividing the second frequency spectrum into two frequency spectrum groups according to an FDD system and a TDD system, the two frequency spectrum groups respectively being an FDD system frequency spectrum group and a TDD system frequency spectrum group; dividing the second frequency spectrum into multiple frequency spectrum groups according to signalling configurations; and dividing the second frequency spectrum depending on whether frequency spectrums are continuous, wherein each section of continuous frequency spectrum forms one frequency spectrum group.

Embodiment I

This embodiment provides a carrier aggregation method, enabling effective data transmission in carrier aggregation scenarios. The method includes: performing frequency spectrum aggregation on multiple frequency spectrums of different systems, wherein the above-mentioned frequency spectrum aggregation is one of the following: aggregation of at least one frequency spectrum corresponding to a TDD system and at least one frequency spectrum corresponding to FDD; aggregation of TDD system frequency spectrums of different uplink and downlink configurations; and aggregation of frequency spectrums of any two or multiple different systems of an LTE system, an HSUPA system, an HSDPA system, an HSPA+ system, a WCDMA system, a CDMA system, UMB, a TD-SCDMA system, 16e/m/n and WIFI.

In the described embodiment, the above-mentioned frequency spectrum may be one frequency spectrum, and may also be continuous or discontinuous multiple frequency spectrums.

In the described embodiment, the above-mentioned TDD system and FDD system are LTE systems or LTE-A systems.

In the described embodiment, as regards intra-frequency spectrum scheduling, transmission is performed according to a timing relationship corresponding to the frequency spectrum.

In the described embodiment, the above-mentioned timing relationship is any one or multiple timing relationships of the timing relationships among physical channel scheduling information, a physical channel, physical channel ACK/NACK and a retransmission physical channel.

In the described embodiment, the above-mentioned physical channel is a PUSCH, PDSCH or physical data channel.

In the described embodiment, when frequency spectrums of different systems are aggregated, as regards intra-frequency spectrum scheduling, transmission is performed according to a timing relationship of a system corresponding to the frequency spectrum.

In the described embodiment, when frequency spectrums of different systems are aggregated, as regards cross-frequency spectrum scheduling, transmission is performed according to a timing relationship of a system corresponding to a frequency spectrum where a scheduled data channel is located.

In the described embodiment, when frequency spectrums of TDD systems of different uplink and downlink configurations are aggregated, as regards intra-frequency spectrum scheduling, transmission is performed according to a timing relationship of an uplink and downlink configuration corresponding to the frequency spectrum.

In the described embodiment, when frequency spectrums of TDD systems of different uplink and downlink configurations are aggregated, as regards cross-frequency spectrum scheduling, transmission is performed according to a timing relationship of an uplink and downlink configuration corresponding to a frequency spectrum where a scheduled data channel is located.

In the described embodiment, when frequency spectrums of different systems are aggregated, as regards cross-frequency spectrum scheduling, a timing relationship between data channel scheduling information and the data channel is scheduled according to a timing relationship of a system corresponding to a frequency spectrum where the scheduling information is located.

In the described embodiment, when frequency spectrums of different systems are aggregated, as regards cross-frequency spectrum scheduling, a timing relationship between a data channel and data channel ACK/NACK feedback is scheduled according to a timing relationship of a system corresponding to a frequency spectrum where the data channel is located.

In the described embodiment, when frequency spectrums of different systems are aggregated, as regards cross-frequency spectrum scheduling, a timing relationship of a retransmission data channel is transmitted according to a timing relationship of a system corresponding to a frequency spectrum where the data channel is located.

In the described embodiment, when frequency spectrums of TDD systems of different uplink and downlink configurations are aggregated, as regards cross-frequency spectrum scheduling, a timing relationship between data channel scheduling information and the data channel is scheduled according to a timing relationship of an uplink and downlink configuration corresponding to a frequency spectrum where the scheduling information is located.

In the described embodiment, when frequency spectrums of TDD systems of different uplink and downlink configurations are aggregated, as regards cross-frequency spectrum scheduling, a timing relationship between a data channel and data channel ACK/NACK feedback is scheduled according to a timing relationship of an uplink and downlink configuration corresponding to a frequency spectrum where the data channel is located.

In the described embodiment, when frequency spectrums of TDD systems of different uplink and downlink configurations are aggregated, as regards cross-frequency spectrum scheduling, a timing relationship of a retransmission data channel is transmitted according to a timing relationship of an uplink and downlink configuration corresponding to a frequency spectrum where the data channel is located.

In the described embodiment, when FDD and TDD frequency spectrums are aggregated, the FDD frequency spectrum and the TDD frequency spectrum respectively correspond to one primary frequency spectrum (PCC); or after the FDD frequency spectrum and the TDD frequency spectrum are aggregated, there is only one primary frequency spectrum.

According to this implementation, a timing relationship among physical channel scheduling information, a physical channel, physical channel ACK/NACK and a retransmission physical channel is defined, thereby achieving effective data transmission in carrier aggregation scenarios, and improving the frequency spectrum utilization.

Embodiment II

This embodiment provides a frequency spectrum aggregation method. This embodiment combines the above-mentioned embodiment and implementations therein.

FIG. 4 is schematic diagram I of a timing relationship among PUSCH scheduling information, a PUSCH, PUSCH ACK/NACK and a retransmission PUSCH according to an embodiment of the disclosure. As shown in FIG. 4, frequency spectrum aggregation may be continuous FDD system frequency spectrum and continuous TDD frequency spectrum aggregation, may be discontinuous FDD system frequency spectrum and continuous TDD frequency spectrum aggregation, may be continuous FDD system frequency spectrum and discontinuous TDD frequency spectrum aggregation, and may be discontinuous FDD system spectrum and discontinuous TDD frequency spectrum aggregation.

The frequency spectrum aggregation may be aggregation of discontinuous TDD frequency spectrums of different uplink and downlink configurations, as shown in FIG. 5.

Figures 6, 7:
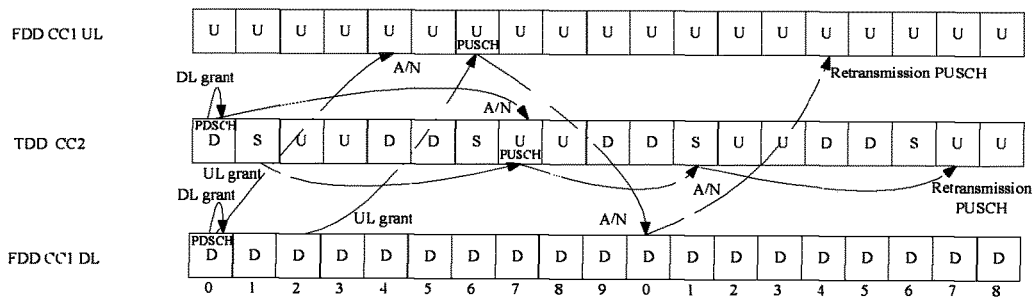
FIG. 6 is schematic diagram III of a timing relationship among PDSCH scheduling information, a PDSCH, PDSCH ACK/NACK and a retransmission PDSCH according to an embodiment of the disclosure.
FIG. 7 is schematic diagram I of a timing relationship of data transmission according to an embodiment of the disclosure.

FIG. 6 is schematic diagram III of a timing relationship among PDSCH scheduling information, a PDSCH, PDSCH ACK/NACK and a retransmission PDSCH according to an embodiment of the disclosure. As shown in FIG. 6, corresponding frequency spectrum aggregation may be aggregation of any two or more frequency spectrums of frequency spectrums of a WCDMA system, an LTE-A system, an LTE system, a CDMA system, a 16e/m/n system, HSPA+ and a WIFI (802.16 11a/11ac, etc.) system.

Embodiment III

This embodiment provides a frequency spectrum aggregation method. This embodiment combines the above-mentioned embodiment and implementations therein.

In this embodiment, it is assumed that two frequency spectrums (CC1) used for uplink and downlink FDD systems and a frequency spectrum (CC2) used for a TDD system are aggregated; the TDD system uses an uplink and downlink configuration 1; and the intra-frequency spectrum scheduling is transmitted according to a timing relationship of a system corresponding to the frequency spectrum.

FIG. 7 is schematic diagram I of a timing relationship of data transmission according to an embodiment of the disclosure. As shown in FIG. 7, the specific timing relationship is as follows.

When a UE detects, on frequency spectrum b corresponding to subframe n, a PDCCH channel which bears PDSCH scheduling information on frequency spectrum b and belongs to the UE, the UE receives the PDSCH at the location indicated by the scheduling information on frequency spectrum b corresponding to subframe n. In the described embodiment, frequency spectrum b is an FDD system, or a TDD system.

If frequency spectrum b is an FDD system, when a UE detects, on frequency spectrum b corresponding to subframe n, a PDCCH channel which bears PUSCH scheduling information on frequency spectrum b and belongs to the UE, or the UE receives, on frequency spectrum b corresponding to subframe n, a PHICH which corresponds to the PUSCH on frequency spectrum b and belongs to the UE, the UE will transmit PUSCH data on frequency spectrum b corresponding to subframe n+4 according to situations. If frequency spectrum b is TDD, when a UE detects, on frequency spectrum b corresponding to subframe n, a PDCCH channel which bears PUSCH scheduling information on frequency spectrum b and belongs to the UE, or the UE receives, on frequency spectrum b corresponding to subframe n, a PHICH which corresponds to the PUSCH on frequency spectrum b and belongs to the UE, the UE will transmit PUSCH data on frequency spectrum b corresponding to subframe n+k according to situations. The value of k above is as shown in Table 2, and is determined according to an uplink and downlink configuration corresponding to frequency spectrum b.

When the PUSCH is transmitted on frequency spectrum b corresponding to subframe n, the UE will detect corresponding PHICH resources on frequency spectrum b corresponding to downlink subframe n+kPHICH, wherein if frequency spectrum b is an FDD system, kPHICH is 4, and if frequency spectrum b is a TDD system, kPHICH is determined according to Table 3 and according to an uplink and downlink configuration corresponding to frequency spectrum b.

If frequency spectrum b is an FDD system, ACK/NACK of a PDSCH transmitted on frequency spectrum b corresponding to downlink subframe n−4 is fed back on frequency spectrum b corresponding to uplink subframe n. If frequency spectrum b is a TDD system, ACK/NACK of a PDSCH transmitted on frequency spectrum b corresponding to downlink subframe n−h is fed back on frequency spectrum b corresponding to uplink subframe n, h∈K, and K is defined as in Table 4, and is determined according to an uplink and downlink configuration corresponding to frequency spectrum b.

This embodiment also describes the case of cross-frequency spectrum scheduling, where transmission is performed according to a timing relationship of a system corresponding to a scheduled data channel. The system corresponding to frequency spectrum m is FDD, and the system corresponding to frequency spectrum d is TDD.

Figure 8:
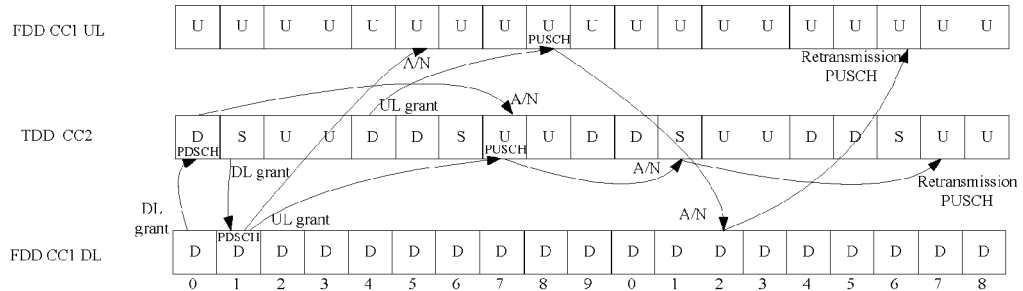
FIG. 8 is schematic diagram II of a timing relationship of data transmission according to an embodiment of the disclosure.

FIG. 8 is schematic diagram II of a timing relationship of data transmission according to an embodiment of the disclosure. As shown in FIG. 8, the specific timing relationship is as follows.

When a UE detects, on frequency spectrum d corresponding to subframe n, a PDCCH channel which bears PDSCH scheduling information on frequency spectrum m and belongs to the UE, the UE receives the PDSCH at the location indicated by the scheduling information on frequency spectrum m corresponding to subframe n.

When a UE detects, on frequency spectrum d corresponding to subframe n, a PDCCH channel which bears PUSCH scheduling information on frequency spectrum m and belongs to the UE, the UE will transmit PUSCH data on frequency spectrum m corresponding to subframe n+4.

When a UE detects, on frequency spectrum m corresponding to subframe n, a PDCCH channel which bears PUSCH scheduling information on frequency spectrum d and belongs to the UE, the UE will transmit PUSCH data on frequency spectrum d corresponding to subframe n+k. The value of k is as shown in Table 2, and is determined according to an uplink and downlink configuration corresponding to frequency spectrum d.

When the PUSCH is transmitted on frequency spectrum a corresponding to subframe n, the UE will detect corresponding PHICH resources on frequency spectrum a corresponding to downlink subframe n+kPHICH, wherein if frequency spectrum a is an FDD system, kPHICH is 4, and if frequency spectrum a is a TDD system, kPHICH is determined according to Table 3 and according to an uplink and downlink configuration corresponding to frequency spectrum a.

If frequency spectrum a is an FDD system, ACK/NACK of a PDSCH transmitted on frequency spectrum a corresponding to downlink subframe n−4 is fed back on frequency spectrum a corresponding to uplink subframe n, and if frequency spectrum a is a TDD system, ACK/NACK of a PDSCH transmitted on frequency spectrum a corresponding to downlink subframe n−h is fed back on frequency spectrum a corresponding to uplink subframe n, h∈K, and K is defined in Table 4, and is determined according to an uplink and downlink configuration corresponding to frequency spectrum a.

Embodiment IV

This embodiment provides a frequency spectrum aggregation method. This embodiment combines the above-mentioned embodiment and implementations therein.

In this embodiment, it is assumed that two frequency spectrums (CC1s) used for uplink and downlink FDD systems and one frequency spectrum (CC2) used for a TDD system are aggregated. The TDD system uses an uplink and downlink configuration 1; and the intra-frequency spectrum scheduling is transmitted according to a timing relationship of a system corresponding to the frequency spectrum.

FIG. 7 is schematic diagram I of a timing relationship of data transmission according to an embodiment of the disclosure. As shown in FIG. 7, the specific timing relationship is as follows.

When a UE detects, on frequency spectrum b corresponding to subframe n, a PDCCH channel which bears PDSCH scheduling information on frequency spectrum b and belongs to the UE, the UE receives the PDSCH at the location indicated by the scheduling information on frequency spectrum b corresponding to subframe n. In the described embodiment, frequency spectrum b is an FDD system, or a TDD system.

If frequency spectrum b is an FDD system, when a UE detects, on frequency spectrum b corresponding to subframe n, a PDCCH channel which bears PUSCH scheduling information on frequency spectrum b and belongs to the UE, or the UE receives, on frequency spectrum b corresponding to subframe n, a PHICH which corresponds to the PUSCH on frequency spectrum b and belongs to the UE, the UE will transmit PUSCH data on frequency spectrum b corresponding to subframe n+4 according to situations. If frequency spectrum b is a TDD system, when a UE detects, on frequency spectrum b corresponding to subframe n, a PDCCH channel which bears PUSCH scheduling information on frequency spectrum b and belongs to the UE, or the UE receives, on frequency spectrum b corresponding to subframe n, a PHICH which corresponds to the PUSCH on frequency spectrum b and belongs to the UE, the UE will transmit PUSCH data on frequency spectrum b corresponding to subframe n+k according to situations. The value of k above is as defined in Table 2, and is determined according to an uplink and downlink configuration corresponding to frequency spectrum b.

When the PUSCH is transmitted on frequency spectrum b corresponding to subframe n, the UE will detect corresponding PHICH resources on frequency spectrum b corresponding to downlink subframe n+kPHICH, wherein if frequency spectrum b is an FDD system, kPHICH is 4, and if frequency spectrum b is a TDD system, kPHICH is determined according to Table 3 and according to an uplink and downlink configuration corresponding to frequency spectrum b.

If frequency spectrum b is an FDD system, ACK/NACK of a PDSCH transmitted on frequency spectrum b corresponding to downlink subframe n−4 is fed back on frequency spectrum b corresponding to uplink subframe n, and if frequency spectrum b is a TDD system, ACK/NACK of a PDSCH transmitted on frequency spectrum b corresponding to downlink subframe n−h is fed back on frequency spectrum b corresponding to uplink subframe n, h∈K, and K is defined in Table 4, and is determined according to an uplink and downlink configuration corresponding to frequency spectrum b.

This embodiment also describes the case of cross-frequency spectrum scheduling, where transmission is performed according to a timing relationship of a system corresponding to a scheduled data channel. The system corresponding to frequency spectrum m is FDD, and the system corresponding to frequency spectrum d is TDD.

Figure 9:
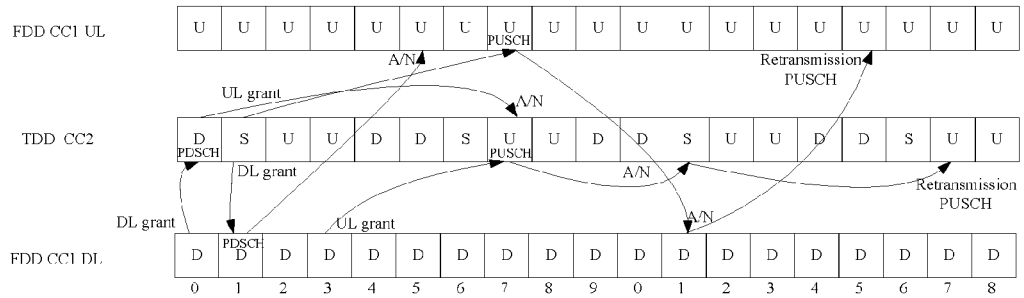
FIG. 9 is schematic diagram III of a timing relationship of data transmission according to an embodiment of the disclosure.

FIG. 9 is schematic diagram III of a timing relationship of data transmission according to an embodiment of the disclosure. As shown in FIG. 9, the specific timing relationship is as follows.

When a UE detects, on frequency spectrum d corresponding to subframe n, a PDCCH channel which bears PDSCH scheduling information on frequency spectrum m and belongs to the UE, the UE receives the PDSCH at the location indicated by the scheduling information on frequency spectrum m corresponding to subframe n.

When a UE detects, on frequency spectrum m corresponding to subframe n, a PDCCH channel which bears PUSCH scheduling information on frequency spectrum d and belongs to the UE, the UE will transmit PUSCH data on frequency spectrum d corresponding to subframe n+4.

When a UE detects, on frequency spectrum d corresponding to subframe n, a PDCCH channel which bears PUSCH scheduling information on frequency spectrum m and belongs to the UE, the UE will transmit PUSCH data on frequency spectrum m corresponding to subframe n+k. The value of k is determined according to an uplink and downlink configuration corresponding to frequency spectrum d in Table 2.

When the PUSCH is transmitted on frequency spectrum a corresponding to subframe n, the UE will detect corresponding PHICH resources on frequency spectrum a corresponding to downlink subframe n+kPHICH, wherein if frequency spectrum a is an FDD system, kPHICH is 4, and if frequency spectrum a is a TDD system, kPHICH is determined according to Table 3 and according to an uplink and downlink configuration corresponding to frequency spectrum a.

If frequency spectrum a is an FDD system, ACK/NACK of a PDSCH transmitted on frequency spectrum a corresponding to downlink subframe n−4 is fed back on frequency spectrum a corresponding to uplink subframe n, and if frequency spectrum a is a TDD system, ACK/NACK of a PDSCH transmitted on frequency spectrum a corresponding to downlink subframe n−h is fed back on frequency spectrum a corresponding to uplink subframe n, h∈K, and K is defined in Table 4, and is determined according to an uplink and downlink configuration corresponding to frequency spectrum a.

Embodiment V

This embodiment provides a frequency spectrum aggregation method. This embodiment combines the above-mentioned embodiment and implementations therein.

In this embodiment, it is assumed that two frequency spectrums CC1 and CC2 of TDD systems with different uplink and downlink configurations are aggregated. In the described embodiment, the applied uplink and downlink configurations are respectively 1 and 6. As regards the intra-frequency spectrum scheduling, it is transmitted according to a timing relationship of a system corresponding to the frequency spectrum.

Figure 10:
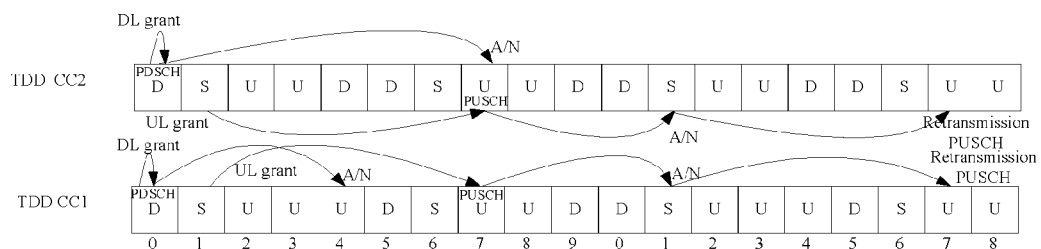
FIG. 10 is schematic diagram IV of a timing relationship of data transmission according to an embodiment of the disclosure.

FIG. 10 is schematic diagram IV of a timing relationship of data transmission according to an embodiment of the disclosure. As shown in FIG. 10, the specific timing relationship is as follows.

When a UE detects, on frequency spectrum b corresponding to subframe n, a PDCCH channel which bears PDSCH scheduling information on frequency spectrum b and belongs to the UE, the UE receives the PDSCH at the location indicated by the scheduling information on frequency spectrum b corresponding to subframe n. In the described embodiment, an uplink and downlink configuration corresponding to frequency spectrum b is 1 or 6.

When a UE detects, on frequency spectrum b corresponding to subframe n, a PDCCH channel which bears PUSCH scheduling information on frequency spectrum b and belongs to the UE, or the UE receives, on frequency spectrum b corresponding to subframe n, a PHICH which corresponds to the PUSCH on frequency spectrum b and belongs to the UE, the UE will transmit PUSCH data on frequency spectrum b corresponding to subframe n+k according to situations. When an uplink and downlink configuration corresponding to frequency spectrum b is 1, the value of k is selected according to uplink and downlink configuration 1 in Table 2; and when an uplink and downlink configuration corresponding to frequency spectrum b is 6, the value of k is selected according to uplink and downlink configuration 6 in Table 2.

When the PUSCH is transmitted on frequency spectrum b corresponding to subframe n, a UE will detect corresponding PHICH resources on frequency spectrum b corresponding to downlink subframe n+kPHICH, wherein if an uplink and downlink configuration corresponding to frequency spectrum b is 1, the value of kPHICH is determined according to uplink and downlink configuration 1 in Table 3; and if an uplink and downlink configuration corresponding to frequency spectrum b is 6, the value of kPHICH is determined according to uplink and downlink configuration 6 in Table 3.

ACK/NACK of a PDSCH transmitted on frequency spectrum b corresponding to downlink subframe n−h is fed back on frequency spectrum b corresponding to uplink subframe n, h∈K; when an uplink and downlink configuration corresponding to frequency spectrum b is 1, K is determined according to uplink and downlink configuration 1 in Table 4; and when an uplink and downlink configuration corresponding to frequency spectrum b is 6, K is determined according to uplink and downlink configuration 6 in Table 4.

This embodiment also describes the case of cross-frequency spectrum scheduling, where transmission is performed according to a timing relationship of a system corresponding to a scheduled data channel. In the described embodiment, an uplink and downlink configuration corresponding to frequency spectrum m is 1, and an uplink and downlink configuration corresponding to frequency spectrum d is 6.

Figure 11:
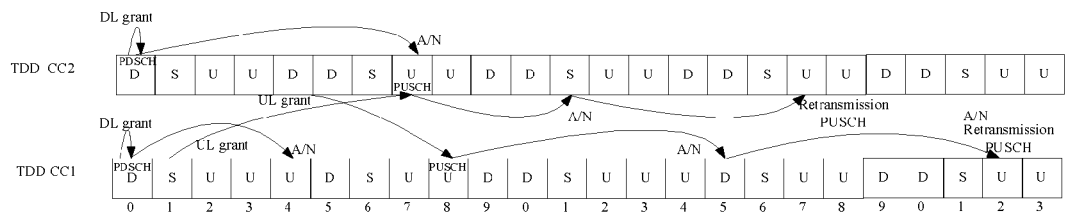
FIG. 11 is schematic diagram V of a timing relationship of data transmission according to an embodiment of the disclosure.

FIG. 11 is schematic diagram V of a timing relationship of data transmission according to an embodiment of the disclosure. As shown in FIG. 11, the specific timing relationship is as follows.

When a UE detects, on frequency spectrum d corresponding to subframe n, a PDCCH channel which bears PDSCH scheduling information on frequency spectrum m and belongs to the UE, the UE receives the PDSCH at the location indicated by the scheduling information on frequency spectrum m corresponding to subframe n.

When a UE detects, on frequency spectrum m corresponding to subframe n, a PDCCH channel which bears PUSCH scheduling information on frequency spectrum d and belongs to the UE, the UE will transmit PUSCH data on frequency spectrum d corresponding to subframe n+k. The value of k is as shown in Table 2, and is determined according to an uplink and downlink configuration corresponding to frequency spectrum d.

When the PUSCH is transmitted on frequency spectrum a corresponding to subframe n, the UE will detect corresponding PHICH resources on frequency spectrum a corresponding to downlink subframe n+kPHICH, wherein if frequency spectrum a is an FDD system, kPHICH is 4, and if frequency spectrum a is a TDD system, kPHICH is determined according to Table 3 and according to an uplink and downlink configuration corresponding to frequency spectrum a.

Frequency spectrum a is a TDD system, and ACK/NACK of a PDSCH transmitted on frequency spectrum a corresponding to downlink subframe n−h is fed back on frequency spectrum a corresponding to uplink subframe n, h∈K, and K is defined in Table 4 and is determined according to an uplink and downlink configuration corresponding to frequency spectrum a;

Embodiment VI

This embodiment provides a frequency spectrum aggregation method. This embodiment combines the above-mentioned embodiment and implementations therein.

In this embodiment, it is assumed that two frequency spectrums CC1 and CC2 of TDD systems with different uplink and downlink configurations are aggregated. In the described embodiment, the applied uplink and downlink configurations are respectively 1 and 6. The intra-frequency spectrum scheduling is transmitted according to a timing relationship of a system corresponding to the frequency spectrum.

FIG. 10 is schematic diagram IV of a timing relationship of data transmission according to an embodiment of the disclosure. As shown in FIG. 10:

when a UE detects, on frequency spectrum b corresponding to subframe n, a PDCCH channel which bears PDSCH scheduling information on frequency spectrum b and belongs to the UE, the UE receives the PDSCH at the location indicated by the scheduling information on frequency spectrum b corresponding to subframe n. In the described embodiment, an uplink and downlink configuration corresponding to frequency spectrum b is 1 or 6.

When a UE detects, on frequency spectrum b corresponding to subframe n, a PDCCH channel which bears PUSCH scheduling information on frequency spectrum b and belongs to the UE, or the UE receives, on frequency spectrum b corresponding to subframe n, a PHICH which corresponds to the PUSCH on frequency spectrum b and belongs to the UE, the UE will transmit PUSCH data on frequency spectrum b corresponding to subframe n+k according to situations. When an uplink and downlink configuration corresponding to frequency spectrum b is 1, the value of k is selected according to uplink and downlink configuration 1 in Table 2; and when an uplink and downlink configuration corresponding to frequency spectrum b is 6, the value of k is selected according to uplink and downlink configuration 6 in Table 2.

When the PUSCH is transmitted on frequency spectrum b corresponding to subframe n, a UE will detect corresponding PHICH resources on frequency spectrum b corresponding to downlink subframe n+kPHICH, wherein if an uplink and downlink configuration corresponding to frequency spectrum b is 1, the value of kPHICH is determined according to uplink and downlink configuration 1 in Table 3; and if an uplink and downlink configuration corresponding to frequency spectrum b is 6, the value of kPHICH is determined according to uplink and downlink configuration 6 in Table 3.

ACK/NACK of a PDSCH transmitted on frequency spectrum b corresponding to downlink subframe n−h is fed back on frequency spectrum b corresponding to uplink subframe n, h∈K; when an uplink and downlink configuration corresponding to frequency spectrum b is 1, K is determined according to uplink and downlink configuration 1 in Table 4; and when an uplink and downlink configuration corresponding to frequency spectrum b is 6, K is determined according to uplink and downlink configuration 6 in Table 4.

This embodiment also describes the case of cross-frequency spectrum scheduling, where transmission is performed according to a timing relationship of a system corresponding to a scheduled data channel. An uplink and downlink configuration corresponding to frequency spectrum m is 1, and an uplink and downlink configuration corresponding to frequency spectrum d is 6.

Figure 12:
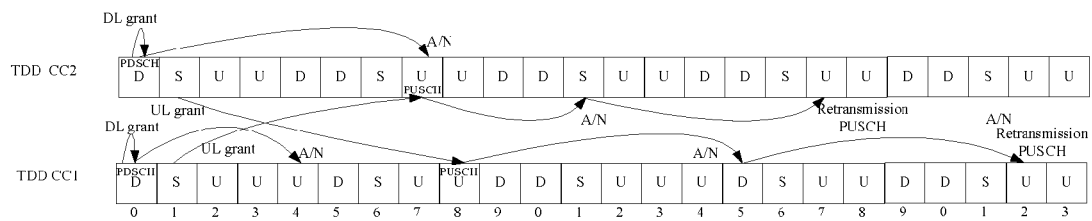
FIG. 12 is schematic diagram VI of a timing relationship of data transmission according to an embodiment of the disclosure.

FIG. 12 is schematic diagram VI of a timing relationship of data transmission according to an embodiment of the disclosure. As shown in FIG. 12, the specific timing relationship is as follows.

When a UE detects, on frequency spectrum d corresponding to subframe n, a PDCCH channel which bears PDSCH scheduling information on frequency spectrum m and belongs to the UE, the UE receives the PDSCH at the location indicated by the scheduling information on frequency spectrum m corresponding to subframe n.

When a UE detects, on frequency spectrum m corresponding to subframe n, a PDCCH channel which bears PUSCH scheduling information on frequency spectrum d and belongs to the UE, the UE will transmit PUSCH data on frequency spectrum d corresponding to subframe n+k. The value of k is as shown in Table 2, and is determined according to an uplink and downlink configuration corresponding to frequency spectrum m.

When the PUSCH is transmitted on frequency spectrum a corresponding to subframe n, the UE will detect corresponding PHICH resources on frequency spectrum a corresponding to downlink subframe n+kPHICH, wherein if frequency spectrum a is an FDD system, kPHICH is 4, and if frequency spectrum a is a TDD system, kPHICH is determined according to Table 3 and according to an uplink and downlink configuration corresponding to frequency spectrum a.

Frequency spectrum a is a TDD system, and ACK/NACK of a PDSCH transmitted on frequency spectrum a corresponding to downlink subframe n−h is fed back on frequency spectrum a corresponding to uplink subframe n, h∈K, and K is as defined in Table 4 and is determined according to an uplink and downlink configuration corresponding to frequency spectrum a.

Figure 13:
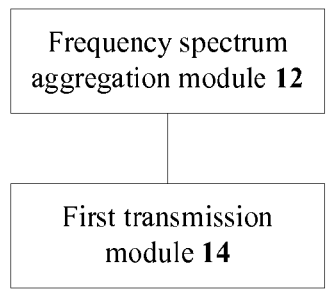
FIG. 13 is a structural block diagram of an apparatus for data transmission according to an embodiment of the disclosure.

This embodiment provides an apparatus for data transmission for implementing the above-mentioned method for data transmission. FIG. 13 is a structural block diagram of an apparatus for data transmission according to an embodiment of the disclosure, the apparatus including: a frequency spectrum aggregation module 12 and a first transmission module 14. The above-mentioned structure will be described in detail below.

The frequency spectrum aggregation module 12 is configured to perform frequency spectrum aggregation on multiple first frequency spectrums corresponding to multiple systems; and the first transmission module 14 is connected to the frequency spectrum aggregation module 12 and is configured to transmit data on a second frequency spectrum formed through the frequency spectrum aggregation of the frequency spectrum aggregation module 12 performed on the multiple first frequency spectrums.

Figure 14:
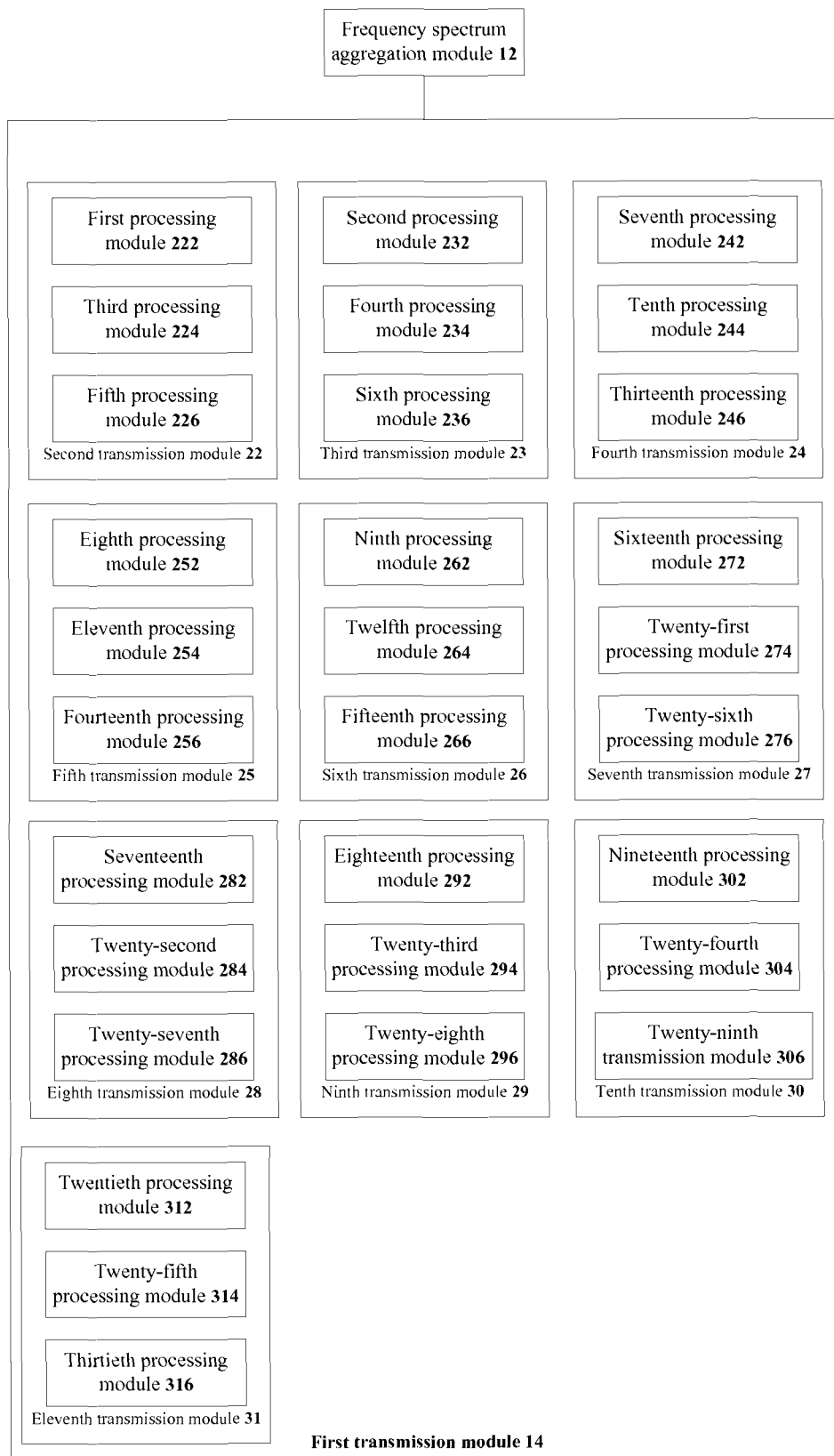
FIG. 14 is a preferred structural block diagram of an apparatus for data transmission according to an embodiment of the disclosure.

FIG. 14 is a preferred structural block diagram of an apparatus for data transmission according to an embodiment of the disclosure. The preferred structure will be described in detail below.

The first transmission module 14 includes: a second transmission module 22, configured to transmit data of a physical data channel on the second frequency spectrum according to a timing relationship of a system corresponding to a first frequency spectrum where the physical data channel is located; or a third transmission module 23, configured to transmit data of a physical data channel on the second frequency spectrum according to a timing relationship of a system corresponding to a first frequency spectrum where scheduling information corresponding to the physical data channel is located.

In the described embodiment, the second transmission module 22 includes: a first processing module 222, configured to, when the second frequency spectrum is the frequency spectrum aggregation of frequency spectrums of time division duplex (TDD) systems with multiple different uplink and downlink configurations, transmit data of the physical data channel according to a timing relationship corresponding to a TDD system with an uplink and downlink configuration of the first frequency spectrum where the physical data channel is located.

In the described embodiment, the third transmission module 23 includes: a second processing module 232, configured to, when the second frequency spectrum is the frequency spectrum aggregation of frequency spectrums of multiple TDD systems with different uplink and downlink configurations, transmit the data of the physical data channel according to a timing relationship corresponding to a TDD system with an uplink and downlink configuration of the first frequency spectrum where the scheduling information corresponding to the physical data channel is located.

The second transmission module 22 includes: a third processing module 224, configured to, when the second frequency spectrum is the frequency spectrum aggregation of multiple frequency spectrums of different communication systems, transmit the data of the physical data channel according to a timing relationship of a communication system corresponding to the first frequency spectrum where the physical data channel is located.

The third transmission module 23 includes: a fourth processing module 234, configured to, when the second frequency spectrum is the frequency spectrum aggregation of multiple frequency spectrums of different communication systems, transmit the data of the physical data channel according to a timing relationship of a communication system corresponding to the first frequency spectrum where the scheduling information corresponding to the physical data channel is located. In the described embodiment, the communication systems include two of or any combination of the following: a long-term evolution (LTE) system, a high-speed uplink packet access (HSDPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI) and an IEEE 802.16e/m/n system.

The second transmission module 22 includes: a fifth processing module 226, configured to, when the second frequency spectrum is the frequency spectrum aggregation of frequency spectrums of a TDD system and an FDD system, transmit the data of the physical data channel according to a timing relationship of a TDD system or FDD system to which the first frequency spectrum, where the physical data channel is located, belongs.

The third transmission module 23 includes: a sixth processing module 236, configured to, when the second frequency spectrum is the frequency spectrum aggregation of frequency spectrums of a TDD system and an FDD system, transmit the data of the physical data channel according to a timing relationship of a TDD system or FDD system to which the first frequency spectrum, where the scheduling information corresponding to the physical data channel is located, belongs.

In the described embodiment, the first transmission module 12 includes: a fourth transmission module 24, configured to transmit acknowledgement/non-acknowledgement (ACK/NACK) information corresponding to a physical data channel on the second frequency spectrum according to a timing relationship of a system corresponding to a first frequency spectrum where the physical data channel is located; or a fifth transmission module 25, configured to transmit ACK/NACK information corresponding to a physical data channel on the second frequency spectrum according to a timing relationship of a first frequency spectrum where scheduling information corresponding to the physical data channel is located; or a sixth transmission module 26, configured to transmit ACK/NACK information corresponding to a physical data channel on the second frequency spectrum according to a timing relationship of a first frequency spectrum where the ACK/NACK information is located.

The fourth transmission module 24 includes: a seventh processing module 242, configured to, when the second frequency spectrum is the frequency spectrum aggregation of frequency spectrums of multiple TDD systems with different uplink and downlink configurations, transmit the ACK/NACK information according to a timing relationship corresponding to a TDD system with an uplink and downlink configuration of the first frequency spectrum where the physical data channel is located.

The fifth transmission module 25 includes: an eighth processing module 252, configured to, when the second frequency spectrum is the frequency spectrum aggregation of frequency spectrums of multiple TDD systems with different uplink and downlink configurations, transmit the ACK/NACK information corresponding to the physical data channel according to a timing relationship corresponding to a TDD system with an uplink and downlink configuration of the first frequency spectrum where the scheduling information corresponding to the physical data channel is located.

The sixth transmission module 26 includes: a ninth processing module 262, configured to, when the second frequency spectrum is the frequency spectrum aggregation of frequency spectrums of multiple TDD systems with different uplink and downlink configurations, transmit the ACK/NACK information corresponding to the physical data channel according to a timing relationship corresponding to a TDD system with an uplink and downlink configuration of the first frequency spectrum where the ACK/NACK information is located.

Alternatively, the fourth transmission module 24 includes: a tenth processing module 244, configured to, when the second frequency spectrum is the frequency spectrum aggregation of multiple frequency spectrums of different communication systems, transmit the ACK/NACK information according to a timing relationship of a communication system corresponding to the first frequency spectrum where the spectrum of the physical data channel is located.

Alternatively, the fifth transmission module 25 includes: an eleventh processing module 254, configured to, when the second frequency spectrum is the frequency spectrum aggregation of multiple frequency spectrums of different communication systems, transmit the ACK/NACK information according to a timing relationship of a communication system corresponding to the first frequency spectrum where the corresponding scheduling information of the physical data channel corresponding to the ACK/NACK information is located; and the sixth transmission module includes: a twelfth processing module, configured to, when the second frequency spectrum is the frequency spectrum aggregation of multiple frequency spectrums of different communication systems, transmit the ACK/NACK information according to a timing relationship of a communication system corresponding to the first frequency spectrum where the ACK/NACK information is located. In the described embodiment, the communication systems include two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, a UMB system, a time division-synchronous code division multiple access (TD-SCDMA) system, wireless fidelity (WIFI) and an IEEE 802.16e/m/n system.

The fourth transmission module 24 includes: a thirteenth processing module 246, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the physical data channel is located, belongs.

The fifth transmission module 25 includes: a fourteenth processing module 256, configured to, when the second frequency spectrum is the frequency spectrum aggregation of frequency spectrums of a time division duplex (TDD) system and a frequency division duplex (FDD) system, transmit the ACK/NACK information according to a timing relationship of a TDD system or FDD system to which the first frequency spectrum, where the scheduling information corresponding to the physical data channel is located, belongs.

The sixth transmission module 26 includes: a fifteenth processing module 266, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the ACK/NACK information is located, belongs.

The first transmission module 14 includes: a seventh transmission module 27, configured to transmit data of a retransmission data channel of the second frequency spectrum according to a timing relationship corresponding to a first frequency spectrum where a data channel of the first transmission of the retransmission data channel is located; or an eighth transmission module 28, configured to transmit data of a retransmission data channel of the second frequency spectrum according to a timing relationship corresponding to a first frequency spectrum where scheduling information corresponding to the retransmission data channel is located; or a ninth transmission module 29, configured to transmit data of a retransmission data channel of the second frequency spectrum according to a timing relationship corresponding to a first frequency spectrum where ACK/NACK information of a previous transmission block corresponding to the retransmission data channel is located; or a tenth transmission module 30, configured to transmit data of a retransmission data channel of the second frequency spectrum according to a timing relationship corresponding to a first frequency spectrum where data retransmitted last time on the retransmission data channel is located; or an eleventh transmission module 31, configured to transmit data of a retransmission data channel of the second frequency spectrum according to a timing relationship corresponding to a first frequency spectrum where the retransmission data channel is located.

The seventh transmission module 27 includes: a sixteenth processing module 272, configured to transmit the data of the retransmission data channel of the second frequency spectrum according to the timing relationship corresponding to the first frequency spectrum where the data channel of the first transmission of the retransmission data channel is located in the following manner: when the second frequency spectrum is frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where the data channel of the first transmission is located. The eighth transmission module 28 includes: a seventeenth processing module 282, configured to, when the second frequency spectrum is the frequency spectrum aggregation of frequency spectrums of time division duplex (TDD) systems with multiple different uplink and downlink configurations, transmit data of the retransmission data channel according to a timing relationship of a TDD system with an uplink and downlink configuration of the first frequency spectrum to which the spectrum, where the scheduling information corresponding to the retransmission data channel is located, belongs. The ninth transmission module 29 includes: an eighteenth processing module 292, configured to, when the second frequency spectrum is the frequency spectrum aggregation of frequency spectrums of time division duplex (TDD) systems with multiple different uplink and downlink configurations, transmit data of the retransmission data channel according to a timing relationship corresponding to a TDD system with an uplink and downlink configuration of the first frequency spectrum where ACK/NACK information of the previous transmission block corresponding to the retransmission data channel is located. The tenth transmission module 30 includes: a nineteenth processing module 302, configured to, when the second frequency spectrum is the frequency spectrum aggregation of frequency spectrums of time division duplex (TDD) systems with multiple different uplink and downlink configurations, transmit data of the retransmission data channel according to a timing relationship of a TDD system with an uplink and downlink configuration of the first frequency spectrum where data retransmitted last time on the retransmission data channel is located. The eleventh transmission module 31 includes: a twentieth processing module 312, configured to, when the second frequency spectrum is the frequency spectrum aggregation of frequency spectrums of multiple TDD systems with different uplink and downlink configurations, transmit the data of the retransmission data channel according to a timing relationship corresponding to the first frequency spectrum where the retransmission data channel is located.

The seventh transmission module 27 includes: a twenty-first processing module 274, configured to, when the second frequency spectrum is the frequency spectrum aggregation of multiple frequency spectrums of different communication systems, transmit the data of the retransmission data channel according to a timing relationship of a communication system corresponding to the first frequency spectrum where the data channel of the first transmission of the retransmission data channel is located. The eighth transmission module 28 includes: a twenty-second processing module 284, configured to, when the second frequency spectrum is the frequency spectrum aggregation of multiple frequency spectrums of different communication systems, transmit the data of the retransmission data channel according to a timing relationship of a communication system corresponding to the first frequency spectrum where the scheduling information corresponding to the retransmission data channel is located. The ninth transmission module 29 includes: a twenty-third processing module 294, configured to, when the second frequency spectrum is the frequency spectrum aggregation of multiple frequency spectrums of different communication systems, transmit the data of the retransmission data channel according to a timing relationship corresponding to a different communication system to which the ACK/NACK information of the previous transmission block corresponding to the retransmission data channel belongs. The tenth transmission module 30 includes: a twenty-fourth processing module 304, configured to, when the second frequency spectrum is the frequency spectrum aggregation of multiple frequency spectrums of different communication systems, transmit the data of the retransmission data channel according to a timing relationship of a communication system corresponding to the first frequency spectrum where the data retransmitted last time on the retransmission data channel is located. The eleventh transmission module 31 includes: a twenty-fifth processing module 314, configured to, when the second frequency spectrum is the frequency spectrum aggregation of multiple frequency spectrums of different communication systems, transmit the data of the retransmission data channel according to a timing relationship of a communication system corresponding to the first frequency spectrum where the retransmission data channel is located. In the described embodiment, the communication systems include two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system.

The seventh transmission module 27 includes: a twenty-sixth processing module 276, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where a data channel of the first transmission is located, belongs. The eighth transmission module 28 includes: a twenty-seventh processing module 286, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where the scheduling information corresponding to the retransmission data channel is located, belongs. The ninth transmission module 29 includes: a twenty-eighth processing module 296, configured to transmit data of the retransmission data channel according to a timing relationship of a TDD system or FDD system to which the first frequency spectrum, where the ACK/NACK information of the previous transmission block corresponding to the retransmission data channel is located, belongs. The tenth transmission module 30 includes: a twenty-ninth processing module 306, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where data retransmitted last time on the retransmission data channel is located, belongs. The eleventh transmission module 31 includes: a thirtieth processing module 316, configured to, when the second frequency spectrum is the frequency spectrum aggregation of frequency spectrums of a TDD system and an FDD system, transmit the data of the retransmission data channel according to a timing relationship of a TDD system or FDD system to which the first frequency spectrum, where the retransmission data channel is located, belongs.

By means of the embodiments above, a method and apparatus for data transmission are provided. By performing frequency spectrum aggregation on multiple frequency spectrums of different systems, and performing data transmission on an aggregated frequency spectrum according to timing relationships corresponding to the different systems, effective data transmission in carrier aggregation scenarios is implemented, and the frequency spectrum utilization is improved.

INDUSTRIAL APPLICABILITY

The technical solution of the disclosure performs frequency spectrum aggregation on multiple frequency spectrums of different systems, and performs data transmission on an aggregated frequency spectrum according to timing relationships corresponding to the different systems, implementing effective data transmission in carrier aggregation scenarios, improving the frequency spectrum utilization, and optimizing the performance of the whole system.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The above description is only the preferred examples of the present document, which is not used to limit the present document. Any modification, equivalent replacement, or improvement made within the spirit and principle of the disclosure shall all fall within the protection scope as defined in the appended claims of the disclosure.

What is claimed is:

1. A method for data transmission, comprising:
performing frequency spectrum aggregation on multiple first frequency spectrums corresponding to multiple systems; and
transmitting data on a second frequency spectrum formed through the frequency spectrum aggregation performed on the multiple first frequency spectrums, wherein the second frequency spectrum is a group of frequency spectrums or the second frequency spectrum is divided into multiple frequency spectrum groups according to a predetermined rule, wherein each frequency spectrum group corresponds to one primary frequency spectrum (PCC),
wherein transmitting the data on the second frequency spectrum formed through the frequency spectrum aggregation performed on the multiple first frequency spectrums comprises: transmitting data of a retransmission data channel of the second frequency spectrum according to a timing relationship corresponding to a first frequency spectrum where a data channel of first transmission of the retransmission data channel is located; or transmitting data of a retransmission data channel of the second frequency spectrum according to a timing relationship corresponding to a first frequency spectrum where scheduling information corresponding to the retransmission data channel is located; or transmitting data of a retransmission data channel of the second frequency spectrum according to a timing relationship corresponding to a first frequency spectrum where ACK/NACK information of a previous transmission block corresponding to the retransmission data channel is located; or transmitting data of a retransmission data channel of the second frequency spectrum according to a timing relationship corresponding to a first frequency spectrum where data retransmitted last time on the retransmission data channel is located; or transmitting data of a retransmission data channel of the second frequency spectrum according to a timing relationship corresponding to a first frequency spectrum where the retransmission data channel is located;
wherein transmitting the data of the retransmission data channel of the second frequency spectrum according to the timing relationship corresponding to the first frequency spectrum where the data channel of the first transmission of the retransmission data channel is located comprises: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where the data channel of the first transmission is located; and/or transmitting the data of the retransmission data channel of the second frequency spectrum according to the timing relationship corresponding to the first frequency spectrum where the scheduling information corresponding to the retransmission data channel is located comprises: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum to which the spectrum, where the scheduling information corresponding to the retransmission data channel is located, belongs; and/or
transmitting the data of the retransmission data channel of the second frequency spectrum according to the timing relationship corresponding to the first frequency spectrum where the ACK/NACK information of the previous transmission block corresponding to the retransmission data channel is located comprises: when the second frequency spectrum is the frequency spectrum aggregation of frequency spectrums of multiple TDD systems with different uplink and downlink configurations, transmitting data of the retransmission data channel according to a timing relationship corresponding to a TDD system with an uplink and downlink configuration of the first frequency spectrum where ACK/NACK information of the previous transmission block corresponding to the retransmission data channel is located; and/or transmitting the data of the retransmission data channel of the second frequency spectrum according to the timing relationship corresponding to the first frequency spectrum where data retransmitted last time on the retransmission data channel is located comprises: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where data retransmitted last time on the retransmission data channel is located; and/or transmitting the data of the retransmission data channel of the second frequency spectrum according to the timing relationship corresponding to the first frequency spectrum where the retransmission data channel is located comprises: when the second frequency spectrum is the frequency spectrum aggregation of frequency spectrums of multiple TDD systems with different uplink and downlink configurations, transmitting data of the retransmission data channel according to a timing relationship corresponding to the first frequency spectrum where the retransmission data channel is located; and/or transmitting the data of the retransmission data channel of the second frequency spectrum according to the timing relationship corresponding to the first frequency spectrum where the data channel of the first transmission of the retransmission data channel is located comprises: when the second frequency spectrum is the frequency spectrum aggregation of multiple frequency spectrums of different communication systems, transmitting data of the retransmission data channel according to a timing relationship of a communication system corresponding to the first frequency spectrum where the data channel of the first transmission of the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the data of the retransmission data channel of the second frequency spectrum according to the timing relationship corresponding to the first frequency spectrum where the scheduling information corresponding to the retransmission data channel is located comprises: when the second frequency spectrum is the frequency spectrum aggregation of multiple frequency spectrums of different communication systems, transmitting data of the retransmission data channel according to a timing relationship of a communication system corresponding to the first frequency spectrum where the scheduling information corresponding to the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the data of the retransmission data channel of the second frequency spectrum according to the timing relationship corresponding to the first frequency spectrum where the ACK/NACK information of the previous transmission block corresponding to the retransmission data channel is located comprises: when the second frequency spectrum is the frequency spectrum aggregation of multiple frequency spectrums of different communication systems, transmitting data of the retransmission data channel according to a timing relationship corresponding to a different communication system to which the ACK/NACK information of the previous transmission block corresponding to the retransmission data channel belongs, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the data of the retransmission data channel of the second frequency spectrum according to the timing relationship corresponding to the first frequency spectrum where the data retransmitted last time on the retransmission data channel is located comprises: when the second frequency spectrum is the frequency spectrum aggregation of multiple frequency spectrums of different communication systems, transmitting data of the retransmission data channel according to a timing relationship of a communication system corresponding to the first frequency spectrum where the data retransmitted last time on the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the data of the retransmission data channel of the second frequency spectrum according to the timing relationship corresponding to the first frequency spectrum where the retransmission data channel is located comprises: when the second frequency spectrum is the frequency spectrum aggregation of multiple frequency spectrums of different communication systems, transmitting data of the retransmission data channel according to a timing relationship of a communication system corresponding to the first frequency spectrum where the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the data of the retransmission data channel of the second frequency spectrum according to the timing relationship corresponding to the first frequency spectrum where the data channel of the first transmission of the retransmission data channel is located comprises: when the second frequency spectrum is the frequency spectrum aggregation of frequency spectrums of a time division duplex (TDD) system and a frequency division duplex (FDD) system, transmitting data of the retransmission data channel according to a timing relationship of a TDD system or FDD system to which the first frequency spectrum, where a data channel of the first transmission is located, belongs; and/or transmitting the data of the retransmission data channel of the second frequency spectrum according to the timing relationship corresponding to the first frequency spectrum where the scheduling information corresponding to the retransmission data channel is located comprises: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where the scheduling information corresponding to the retransmission data channel is located, belongs; and/or transmitting the data of the retransmission data channel of the second frequency spectrum according to the timing relationship corresponding to the first frequency spectrum where the ACK/NACK information of the previous transmission block corresponding to the retransmission data channel is located comprises: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where the ACK/NACK information of the previous transmission block corresponding to the retransmission data channel is located, belongs; and/or transmitting the data of the retransmission data channel of the second frequency spectrum according to the timing relationship corresponding to the first frequency spectrum where the data retransmitted last time on the retransmission data channel is located comprises: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where data retransmitted last time on the retransmission data channel is located, belongs; and/or transmitting the data of the retransmission data channel of the second frequency spectrum according to the timing relationship corresponding to the first frequency spectrum where the retransmission data channel is located comprises: when the second frequency spectrum is the frequency spectrum aggregation of frequency spectrums of a TDD system and an FDD system, transmitting data of the retransmission data channel according to a timing relationship of a TDD system or FDD system to which the first frequency spectrum, where the retransmission data channel is located, belongs.

2. The method according to claim 1, wherein transmitting data on the second frequency spectrum formed through the frequency spectrum aggregation performed on the multiple first frequency spectrums comprises:

transmitting data of a physical data channel on the second frequency spectrum according to a timing relationship of a system corresponding to a first frequency spectrum where the physical data channel is located; or transmitting data of a physical data channel on the second frequency spectrum according to a timing relationship of a system corresponding to a first frequency spectrum where scheduling information corresponding to the physical data channel is located.

3. The method according to claim 2, wherein transmitting the data of the physical data channel on the second frequency spectrum according to the timing relationship of the system corresponding to the first frequency spectrum where the physical data channel is located comprises: when the second frequency spectrum is the frequency spectrum aggregation of frequency spectrums of time division duplex (TDD) systems with multiple different uplink and downlink configurations, transmitting the data of the physical data channel according to a timing relationship corresponding to a TDD system with an uplink and downlink configuration of the first frequency spectrum where the physical data channel is located; and/or transmitting the data of the physical data channel on the second frequency spectrum according to the timing relationship of the system corresponding to the first frequency spectrum where the scheduling information corresponding to the physical data channel is located comprises: when the second frequency spectrum is the frequency spectrum aggregation of frequency spectrums of multiple TDD systems with different uplink and downlink configurations, transmitting the data of the physical data channel according to a timing relationship corresponding to a TDD system with an uplink and downlink configuration of the first frequency spectrum where the scheduling information corresponding to the physical data channel is located; and/or transmitting the data of the physical data channel on the second frequency spectrum according to the timing relationship of the system corresponding to the first frequency spectrum where the physical data channel is located comprises: when the second frequency spectrum is the frequency spectrum aggregation of multiple frequency spectrums of different communication systems, transmitting the data of the physical data channel according to a timing relationship of a communication system corresponding to the first frequency spectrum where the physical data channel is located, wherein the communication systems comprise two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI) and an institute of electrical and electronics engineers (IEEE) 802.16e/m/n system; and/or transmitting the data of the physical data channel on the second frequency spectrum according to the timing relationship of the system corresponding to the first frequency spectrum where the scheduling information corresponding to the physical data channel is located comprises: when the second frequency spectrum is the frequency spectrum aggregation of multiple frequency spectrums of different communication systems, transmitting the data of the physical data channel according to a timing relationship of a communication system corresponding to the first frequency spectrum where the scheduling information corresponding to the physical data channel is located, wherein the communication systems comprise two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI)

and an institute of electrical and electronics engineers (IEEE) 802.16e/m/n system; and/or transmitting the data of the physical data channel on the second frequency spectrum according to the timing relationship of the system corresponding to the first frequency spectrum where the physical data channel is located comprises: when the second frequency spectrum is the frequency spectrum aggregation of frequency spectrums of a TDD system and a frequency division duplex (FDD) system, transmitting the data of the physical data channel according to a timing relationship of a TDD system or FDD system to which the first frequency spectrum, where the physical data channel is located, belongs; and/or transmitting the data of the physical data channel on the second frequency spectrum according to the timing relationship of the system corresponding to the first frequency spectrum where the scheduling information corresponding to the physical data channel is located comprises: when the second frequency spectrum is the frequency spectrum aggregation of frequency spectrums of a TDD system and an FDD system, transmitting the data of the physical data channel according to a timing relationship of a TDD system or FDD system to which the first frequency spectrum, where the scheduling information corresponding to the physical data channel is located, belongs.

4. The method according to claim 1, wherein transmitting the data on the second frequency spectrum formed through the frequency spectrum aggregation performed on the multiple first frequency spectrums comprises:

transmitting acknowledgement/non-acknowledgement (ACK/NACK) information corresponding to a physical data channel on the second frequency spectrum according to a timing relationship of a system corresponding to a first frequency spectrum where the physical data channel is located; or transmitting ACK/NACK information corresponding to a physical data channel on the second frequency spectrum according to a timing relationship of a first frequency spectrum where scheduling information corresponding to the physical data channel is located; or transmitting ACK/NACK information corresponding to a physical data channel on the second frequency spectrum according to a timing relationship of a first frequency spectrum where the ACK/NACK information is located.

5. The method according to claim 4, wherein
transmitting the ACK/NACK information corresponding to the physical data channel on the second frequency spectrum according to the timing relationship of the system corresponding to the first frequency spectrum where the physical data channel is located comprises: when the second frequency spectrum is the frequency spectrum aggregation of frequency spectrums of multiple TDD systems with different uplink and downlink configurations, transmitting the ACK/NACK information according to a timing relationship corresponding to a TDD system with an uplink and downlink configuration of the first frequency spectrum where the physical data channel is located; and/or transmitting the ACK/NACK information corresponding to the physical data channel on the second frequency spectrum according to the timing relationship of the first frequency spectrum where the scheduling information corresponding to the physical data channel is located comprises: when the second frequency spectrum is the frequency spectrum aggregation of frequency spectrums of multiple TDD systems with different uplink and downlink configurations, transmitting the ACK/NACK information corresponding to the physical data channel according to a timing relationship corresponding to a TDD system with an uplink and downlink configuration of the first frequency spectrum where the scheduling information corresponding to the physical data channel is located; and/or transmitting the ACK/NACK information corresponding to the physical data channel on the second frequency spectrum according to the timing relationship of the first frequency spectrum where the ACK/NACK information is located comprises: when the second frequency spectrum is the frequency spectrum aggregation of frequency spectrums of multiple TDD systems with different uplink and downlink configurations, transmitting the ACK/NACK information corresponding to the physical data channel according to a timing relationship corresponding to a TDD system with an uplink and downlink configuration of the first frequency spectrum where the ACK/NACK information is located; and/or transmitting the ACK/NACK information corresponding to the physical data channel on the second frequency spectrum according to the timing relationship of the system corresponding to the first frequency spectrum where the physical data channel is located comprises: when the second frequency spectrum is the frequency spectrum aggregation of multiple frequency spectrums of different communication systems, transmitting the ACK/NACK information according to a timing relationship of a communication system corresponding to the first frequency spectrum where the spectrum of the physical data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the ACK/NACK information corresponding to the physical data channel on the second frequency spectrum according to the timing relationship of the first frequency spectrum where the scheduling information corresponding to the physical data channel is located comprises: when the second frequency spectrum is the frequency spectrum aggregation of multiple frequency spectrums of different communication systems, transmitting the ACK/NACK information according to a timing relationship of a communication system corresponding to the first frequency spectrum where the corresponding scheduling information of the physical data channel corresponding to the ACK/NACK information is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the ACK/NACK information corresponding to the physical data channel on the second frequency spectrum according to the timing relationship of the first frequency spectrum where the ACK/NACK information is located comprises: when the second frequency spectrum is the frequency spectrum aggregation of multiple frequency spectrums of different communication systems, transmitting the ACK/NACK information according to a timing relationship of a communication system corresponding to the first frequency spectrum where the ACK/NACK information is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or transmitting the ACK/NACK information corresponding to the physical data channel on the second frequency spectrum according to the timing relationship of the system corresponding to the first frequency spectrum where the physical data channel is located comprises: when the second frequency spectrum is the frequency spectrum aggregation of frequency spectrums of a TDD system and an FDD system, transmitting the ACK/NACK information according to a timing relationship of a TDD system or FDD system to which the first frequency spectrum, where the physical data channel is located, belongs; and/or transmitting the ACK/NACK information corresponding to the physical data channel on the second frequency spectrum according to the timing relationship of the first frequency spectrum where the scheduling information corresponding to the physical data channel is located comprises: when the second frequency spectrum is the frequency spectrum aggregation of frequency spectrums of a TDD system and an FDD system, transmitting the ACK/NACK information according to a timing relationship of a TDD system or FDD system to which the first frequency spectrum, where the scheduling information corresponding to the physical data channel is located, belongs; and/or transmitting the ACK/NACK information corresponding to the physical data channel on the second frequency spectrum according to the timing relationship of the first frequency spectrum where the ACK/NACK information is located comprises: when the second frequency spectrum is the frequency spectrum aggregation of frequency spectrums of a time division duplex (TDD) system and a frequency division duplex (FDD) system, transmitting the ACK/NACK information according to a timing relationship of a TDD system or FDD system to which the first frequency spectrum, where the ACK/NACK information is located, belongs.

6. An apparatus for data transmission, comprising:
a frequency spectrum aggregation module, configured to perform frequency spectrum aggregation on multiple first frequency spectrums corresponding to multiple systems; and
a first transmission module, configured to transmit data on a second frequency spectrum formed through the frequency spectrum aggregation performed on the multiple first frequency spectrums, wherein the second frequency spectrum is a group of frequency spectrums or the second frequency spectrum is divided into multiple frequency spectrum groups according to a predetermined rule, wherein each frequency spectrum group corresponds to one primary frequency spectrum (PCC),
wherein the first transmission module comprises: a seventh transmission module, configured to transmit data of a retransmission data channel of the second frequency spectrum according to a timing relationship corresponding to a first frequency spectrum where a data channel of first transmission of the retransmission data channel is located; or an eighth transmission module, configured to transmit data of a retransmission data channel of the second frequency spectrum according to a timing relationship corresponding to a first frequency spectrum where scheduling information corresponding to the retransmission data channel is located; or a ninth transmission module, configured to transmit data of a retransmission data channel of the second frequency spectrum according to a timing relationship corresponding to a first frequency spectrum where ACK/NACK information of a previous transmission block corresponding to the retransmission data channel is located; or a tenth transmission module, configured to transmit data of a retransmission data channel of the second frequency spectrum according to a timing relationship corresponding to a first frequency spectrum where data retransmitted last time on the retransmission data channel is located; or an eleventh transmission module, configured to transmit data of a retransmission data channel of the second frequency spectrum according to a timing relationship corresponding to a first frequency spectrum where the retransmission data channel is located; wherein the seventh transmission module comprises: a sixteenth processing module, configured to transmit the data of the retransmission data channel of the second frequency spectrum according to the timing relationship corresponding to the first frequency spectrum where the data channel of the first transmission of the retransmission data channel is located in the following manner: when the second frequency spectrum is the frequency spectrum aggregation of frequency spectrums of multiple TDD systems with different uplink and downlink configurations, transmitting data of the retransmission data channel according to a timing relationship of a TDD system with an uplink and downlink configuration of the first frequency spectrum where the data channel of the first transmission is located; and/or the eighth transmission module comprises: a seventeenth processing module, configured to, when the second frequency spectrum is the frequency spectrum aggregation of frequency spectrums of time division duplex (TDD) systems with multiple different uplink and downlink configurations, transmit data of the retransmission data channel according to a timing relationship of a TDD system with an uplink and downlink configuration of the first frequency spectrum to which the spectrum, where the scheduling information corresponding to the retransmission data channel is located, belongs; and/or the ninth transmission module comprises: an eighteenth processing module, configured to, when the second frequency spectrum is the frequency spectrum aggregation of frequency spectrums of time division duplex (TDD) systems with multiple different uplink and downlink configurations, transmit data of the retransmission data channel according to a timing relationship corresponding to a TDD system with an uplink and downlink configuration of the first frequency spectrum where ACK/NACK information of the previous transmission block corresponding to the retransmission data channel is located; and/or the tenth transmission module comprises: a nineteenth processing module, configured to, when the second frequency spectrum is the frequency spectrum aggregation of frequency spectrums of time division duplex (TDD) systems with multiple different uplink and downlink configurations, transmit data of the retransmission data channel according to a timing relationship of a TDD system with an uplink and downlink configuration of the first frequency spectrum where data retransmitted last time on the retransmission data channel is located; and/or the eleventh transmission module comprises: a twentieth processing module, configured to, when the second frequency spectrum is the frequency spectrum aggregation of frequency spectrums of multiple TDD systems with different uplink and downlink configurations, transmit the data of the retransmission data channel according to a timing relationship corresponding to the first frequency spectrum where the retransmission data channel is located; and/or the seventh transmission module comprises: a twenty-first processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the data channel of the first transmission of the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or the eighth transmission module comprises: a twenty-second processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the scheduling information corresponding to the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or the ninth transmission module comprises: a twenty-third processing module, configured to, when the second frequency spectrum is the frequency spectrum aggregation of multiple frequency spectrums of different communication systems, transmit the data of the retransmission data channel according to a timing relationship corresponding to a different communication system to which the ACK/NACK information of the previous transmission block corresponding to the retransmission data channel belongs, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or the tenth transmission module comprises: a twenty-fourth processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the data retransmitted last time on the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or the eleventh transmission module comprises: a twenty-fifth processing module, configured to, when the second frequency spectrum is the frequency spectrum aggregation of multiple frequency spectrums of different communication systems, transmit the data of the retransmission data channel according to a timing relationship of a communication system corresponding to the first frequency spectrum where the retransmission data channel is located, wherein the communication systems comprise two of or any combination of the following: an LTE system, an HSUPA system, an HSDPA system, an HSPA+ system, a WCDMA system, a CDMA 2000 system, a UMB system, a TD-SCDMA system, WIFI and an IEEE 802.16e/m/n system; and/or the seventh transmission module comprises: a twenty-sixth processing module, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where a data channel of the first transmission is located, belongs; and/or the eighth transmission module comprises: a twenty-seventh processing module, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where the scheduling information corresponding to the retransmission data channel is located, belongs; and/or the ninth transmission module comprises: a twenty-eighth processing module, configured to transmit data of the retransmission data channel according to a timing relationship of a TDD system or FDD system to which the first frequency spectrum, where the ACK/NACK information of the previous transmission block corresponding to the retransmission data channel is located, belongs; and/or the tenth transmission module comprises: a twenty-ninth processing module, configured to, when the second frequency spectrum is the frequency spectrum aggregation of frequency spectrums of a time division duplex (TDD) system and a frequency division duplex (FDD) system, transmit the data of the retransmission data channel according to a timing relationship of a TDD system or FDD system to which the first frequency spectrum, where data retransmitted last time on the retransmission data channel is located, belongs; and/or the eleventh transmission module comprises: a thirtieth processing module, configured to, when the second frequency spectrum is the frequency spectrum aggregation of frequency spectrums of a TDD system and an FDD system, transmit the data of the retransmission data channel according to a timing relationship of a TDD system or FDD system to which the first frequency spectrum, where the retransmission data channel is located, belongs.

7. The apparatus according to claim 6, wherein the first transmission module comprises:
a second transmission module, configured to transmit data of a physical data channel on the second frequency spectrum according to a timing relationship of a system corresponding to a first frequency spectrum where the physical data channel is located; or
a third transmission module, configured to transmit data of a physical data channel on the second frequency spectrum according to a timing relationship of a system corresponding to a first frequency spectrum where scheduling information corresponding to the physical data channel is located.

8. The apparatus according to claim 7, wherein
the second transmission module comprises: a first processing module, configured to, when the second frequency spectrum is the frequency spectrum aggregation of frequency spectrums of time division duplex (TDD) systems with multiple different uplink and downlink configurations, transmit the data of the physical data channel according to a timing relationship corresponding to a TDD system with an uplink and downlink configuration of the first frequency spectrum where the physical data channel is located; and/or
the third transmission module comprises: a second processing module, configured to, when the second frequency spectrum is the frequency spectrum aggregation of frequency spectrums of multiple TDD systems with different uplink and downlink configurations, transmit the data of the physical data channel according to a timing relationship corresponding to a TDD system with an uplink and downlink configuration of the first frequency spectrum where the scheduling information corresponding to the physical data channel is located; and/or
the second transmission module comprises: a third processing module, configured to, when the second frequency spectrum is the frequency spectrum aggregation of multiple frequency spectrums of different communication systems, transmit the data of the physical data channel according to a timing relationship of a communication system corresponding to the first frequency spectrum where the physical data channel is located, wherein the communication systems comprise two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI) and an IEEE 802.16e/m/n system; and/or
the third transmission module comprises: a fourth processing module, configured to, when the second frequency spectrum is the frequency spectrum aggregation of multiple frequency spectrums of different communication systems, transmit the data of the physical data channel according to a timing relationship of a communication system corresponding to the first frequency spectrum where the scheduling information corresponding to the physical data channel is located, wherein the communication systems comprise two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, an ultra mobile broadband (UMB) system, a time division-synchronous code division multiple access (TD-SCDMA) system, wireless fidelity (WIFI) and an IEEE 802.16e/m/n system; and/or
the second transmission module comprises: a fifth processing module, configured to, when the second frequency spectrum is the frequency spectrum aggregation of frequency spectrums of a TDD system and a frequency division duplex (FDD) system, transmit the data of the physical data channel according to a timing relationship of a TDD system or FDD system to which the first frequency spectrum, where the physical data channel is located, belongs; and/or
the third transmission module comprises: a sixth processing module, configured to, when the second frequency spectrum is the frequency spectrum aggregation of frequency spectrums of a TDD system and an FDD system, transmit the data of the physical data channel according to a timing relationship of a TDD system or FDD system to which the first frequency spectrum, where the scheduling information corresponding to the physical data channel is located, belongs.

9. The apparatus according to claim 6, wherein the first transmission module comprises:
a fourth transmission module, configured to transmit acknowledgement/non-acknowledgement (ACK/NACK) information corresponding to a physical data channel on the second frequency spectrum according to a timing relationship of a system corresponding to a first frequency spectrum where the physical data channel is located; or
a fifth transmission module, configured to transmit ACK/NACK information corresponding to a physical data channel on the second frequency spectrum according to a timing relationship of a first frequency spectrum where scheduling information corresponding to the physical data channel is located; or
a sixth transmission module, configured to transmit ACK/NACK information corresponding to a physical data channel on the second frequency spectrum according to a timing relationship of a first frequency spectrum where the ACK/NACK information is located.

10. The apparatus according to claim 9, wherein
the fourth transmission module comprises: a seventh processing module, configured to, when the second frequency spectrum is the frequency spectrum aggregation of frequency spectrums of multiple TDD systems with different uplink and downlink configurations, transmit the ACK/NACK information according to a timing relationship corresponding to a TDD system with an uplink and downlink configuration of the first frequency spectrum where the physical data channel is located; and/or
the fifth transmission module comprises: an eighth processing module, configured to, when the second frequency spectrum is the frequency spectrum aggregation of frequency spectrums of multiple TDD systems with different uplink and downlink configurations, transmit the ACK/NACK information corresponding to the physical data channel according to a timing relationship corresponding to a TDD system with an uplink and downlink configuration of the first frequency spectrum where the scheduling information corresponding to the physical data channel is located; and/or
the sixth transmission module comprises: a ninth processing module, configured to, when the second frequency spectrum is the frequency spectrum aggregation of frequency spectrums of multiple TDD systems with different uplink and downlink configurations, transmit the ACK/NACK information corresponding to the physical data channel according to a timing relationship corresponding to a TDD system with an uplink and downlink configuration of the first frequency spectrum where the ACK/NACK information is located; and/or the fourth transmission module comprises: a tenth processing module, configured to, when the second frequency spectrum is the frequency spectrum aggregation of multiple frequency spectrums of different communication systems, transmit the ACK/NACK information according to a timing relationship of a communication system corresponding to the first frequency spectrum where the spectrum of the physical data channel is located, wherein the communication systems comprise two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, a UMB system, a time division-synchronous code division multiple access (TD-SCDMA) system, wireless fidelity (WIFI) and an IEEE 802.16e/m/n system; and/or the fifth transmission module comprises: an eleventh processing module, configured to, when the second frequency spectrum is the frequency spectrum aggregation of multiple frequency spectrums of different communication systems, transmit the ACK/NACK information according to a timing relationship of a communication system corresponding to the first frequency spectrum where the corresponding scheduling information of the physical data channel corresponding to the ACK/NACK information is located, wherein the communication systems comprise two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, a UMB system, a time division-synchronous code division multiple access (TD-SCDMA) system, wireless fidelity (WIFI) and an IEEE 802.16e/m/n system; and/or the sixth transmission module comprises: a twelfth processing module, configured to, when the second frequency spectrum is the frequency spectrum aggregation of multiple frequency spectrums of different communication systems, transmit the ACK/NACK information according to a timing relationship of a communication system corresponding to the first frequency spectrum where the ACK/NACK information is located, wherein the communication systems comprise two of or any combination of the following: a long-term evolution (LTE) system, a high-speed uplink packet access (HSUPA) system, a high-speed downlink packet access (HSDPA) system, a high-speed uplink access evolution (HSPA+) system, a wideband code division multiple access (WCDMA) system, a code division multiple access (CDMA) 2000 system, a UMB system, a time division-synchronous code division multiple access (TD-SCDMA) system, wireless fidelity (WIFI) and an IEEE 802.16e/m/n system; and/or the fourth transmission module comprises: a thirteenth processing module, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the physical data channel is located, belongs; and/or the fifth transmission module comprises: a fourteenth processing module, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the scheduling information corresponding to the physical data channel is located, belongs; and/or the sixth transmission module comprises: a fifteenth processing module, configured to, when the second frequency spectrum is the frequency spectrum aggregation of frequency spectrums of a TDD system and an FDD system, transmit the ACK/NACK information according to a timing relationship of a TDD system or FDD system to which the first frequency spectrum, where the ACK/NACK information is located, belongs.

11. The apparatus according to claim 6, wherein dividing the second frequency spectrum into multiple frequency spectrum groups according to a predetermined rule comprises one of the following:

dividing the second frequency spectrum according to different communication systems, wherein first frequency spectrums with the same communication system are divided into one frequency spectrum group;

dividing the second frequency spectrum into two frequency spectrum groups according to an FDD system and a TDD system, the two frequency spectrum groups respectively being an FDD system frequency spectrum group and a TDD system frequency spectrum group;

dividing the second frequency spectrum into multiple frequency spectrum groups according to signaling configurations; and dividing the second frequency spectrum depending on whether frequency spectrums are continuous, wherein each section of continuous frequency spectrum forms one frequency spectrum group.

12. The apparatus according to claim 6, wherein dividing the second frequency spectrum into multiple frequency spectrum groups according to a predetermined rule comprises one of the following: dividing the second frequency spectrum according to different communication systems, wherein first frequency spectrums with the same communication system are divided into one frequency spectrum group; dividing the second frequency spectrum into two frequency spectrum groups according to an FDD system and a TDD system, the two frequency spectrum groups respectively being an FDD system frequency spectrum group and a TDD system frequency spectrum group; dividing the second frequency spectrum into multiple frequency spectrum groups according to signaling; and dividing the second frequency spectrum depending on whether frequency spectrums are continuous, wherein each section of continuous frequency spectrum forms one frequency spectrum group.

* * * * *